United States Patent
Oda et al.

(10) Patent No.: US 6,694,194 B2
(45) Date of Patent: Feb. 17, 2004

(54) REMOTE WORK SUPPORTING SYSTEM

(75) Inventors: Takahiro Oda, Gunma (JP); Kenji Kadota, Gunma (JP); Yuji Ohta, Gunma (JP); Kenya Suzuki, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 412 days.

(21) Appl. No.: 09/881,348

(22) Filed: Jun. 15, 2001

(65) Prior Publication Data

US 2002/0049510 A1 Apr. 25, 2002

(30) Foreign Application Priority Data

Oct. 25, 2000  (JP) ........................ 2000-325916

(51) Int. Cl.[7] ............................ G06F 11/30; G06F 15/00
(52) U.S. Cl. .............................. 700/9; 700/79; 700/108; 702/183; 702/184
(58) Field of Search ............................. 700/9, 79, 108, 700/109, 110; 702/183, 184, 185; 705/1, 3, 10

(56) References Cited

U.S. PATENT DOCUMENTS

| | | | | |
|---|---|---|---|---|
| 3,882,305 A | * | 5/1975 | Johnstone | |
| 5,877,961 A | * | 3/1999 | Moore | |
| 6,393,380 B1 | * | 5/2002 | Zemlo | 702/184 X |
| 6,556,950 B1 | * | 4/2003 | Schwenke et al. | 702/183 |
| 2002/0052715 A1 | * | 5/2002 | Maki | 702/184 |

FOREIGN PATENT DOCUMENTS

JP          11-275422          8/1999

* cited by examiner

*Primary Examiner*—Emanuel Todd Voeltz
(74) *Attorney, Agent, or Firm*—Rabin & Berdo, P.C.

(57) ABSTRACT

A remote work supporting system includes a photographing device for photographing a work target machine that is to be worked on by a first operator, a first display for displaying an image of the target machine to the first operator, a second display for displaying the same image to a second operator, an operation device to be operated by the second operator, and an instruction displaying device for displaying contents of instructions in the first display based on operations made on the operation device. Since the instruction contents are displayed in the first display according to the operations made on the operation device by the second operator, the first and second operators can share considerable amount of information.

26 Claims, 34 Drawing Sheets

REMOTE WORK SUPPORTING SYSTEM

BACKGROUND OF THE INVENTION

1. Field of the Invention

The present invention relates to a remote work supporting system.

2. Description of the Related Art

In the manufacturing industry, a factory section and design section generally have different facility environments so that these two sections are often located at a distance from each other. Therefore, information exchange and communications between the factory and design sections depend upon drawings of parts and assemblies, job instructions or work directions, face-to-face meeting when a designer or design engineer visits a factory, job training, etc.

When an accident or trouble happens in a factory, the design section sends instructions to the factory by telephone, facsimile or the like. If it is not sufficient, the design engineer or instructor goes to the factory to deal with the trouble.

Recently remote work supporting systems are proposed, which connect the factory section to the design section by a local area network such that drawings and job instructions are issued real time, and these drawings are modified at the meeting. When a design problem occurs in a manufacturing line in a factory, a factory worker (operator) takes photographs of a troubled area, and sends the obtained image information to the design section via the local area network.

OBJECTS AND SUMMARY OF THE INVENTION

In the above described remote work supporting system, however, the area the factory worker notices is only photographed so that particular image information is only sent to the design section. After receiving the image information, therefore, the design section should instruct the factory worker to photograph the background of the troubled area or other areas.

Thus, a considerable time is required to finish the analysis of the troubled area. After all, the design engineer needs to visit the factory in order to see the surrounding area of the troubled area and other areas by his or her own eyes.

In short, although the factory and design sections are connected to each other by the local area network, the factory worker and design engineer can only share the information of substantially the same level as the drawings and work instructions and they can only enjoy poor information sharing.

In the meantime, there are an increasing number of companies that relocate their factory sections overseas. This not only makes a longer period required for the problem analysis but also raises a manufacturing cost.

An object of the present invention is to provide a remote work supporting system that can eliminate the above described problems of the conventional remote work supporting system, whereby the factory worker (i.e., operator) and design engineer (i.e., instructor) can share sufficient information so that the trouble shooting period is reduced and the manufacturing cost is lowered.

To this end, the present invention provides a remote work supporting system that includes a photographing means for photographing a work target machine that is to be worked on by a first operator, a first display for displaying an image of the target machine captured by the photographing means to the first operator, a second display for displaying the same image to a second operator, an operation device to be operated by the second operator, and an instruction displaying means for displaying contents of instructions in the first display based on operations made on the operation device.

DETAILED DESCRIPTION OF THE INVENTION

Now, embodiments of the present invention will be described in reference to the drawings.

Figure 1:
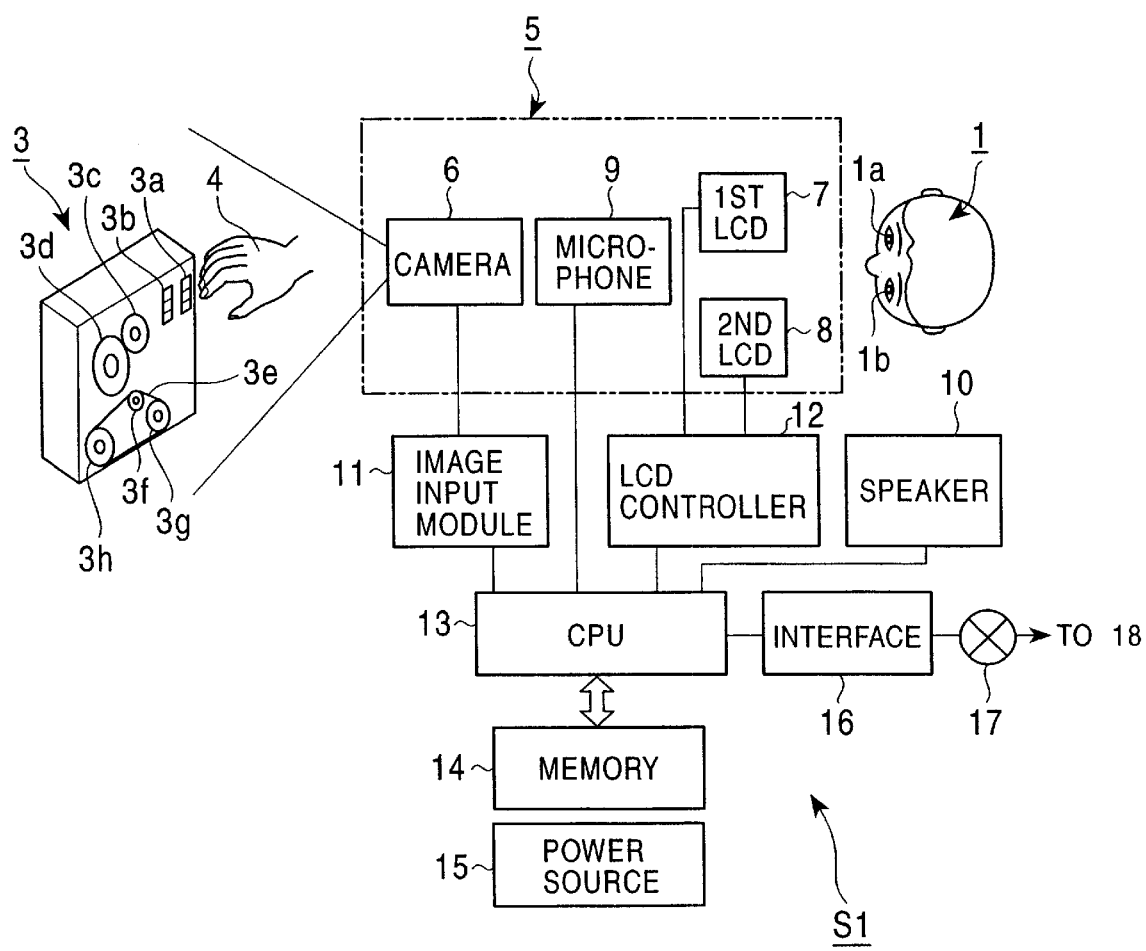
FIG. 1 illustrates a block diagram of a remote work supporting system on an operator (first operator) side according to the first embodiment of the present invention.
Figure 2:
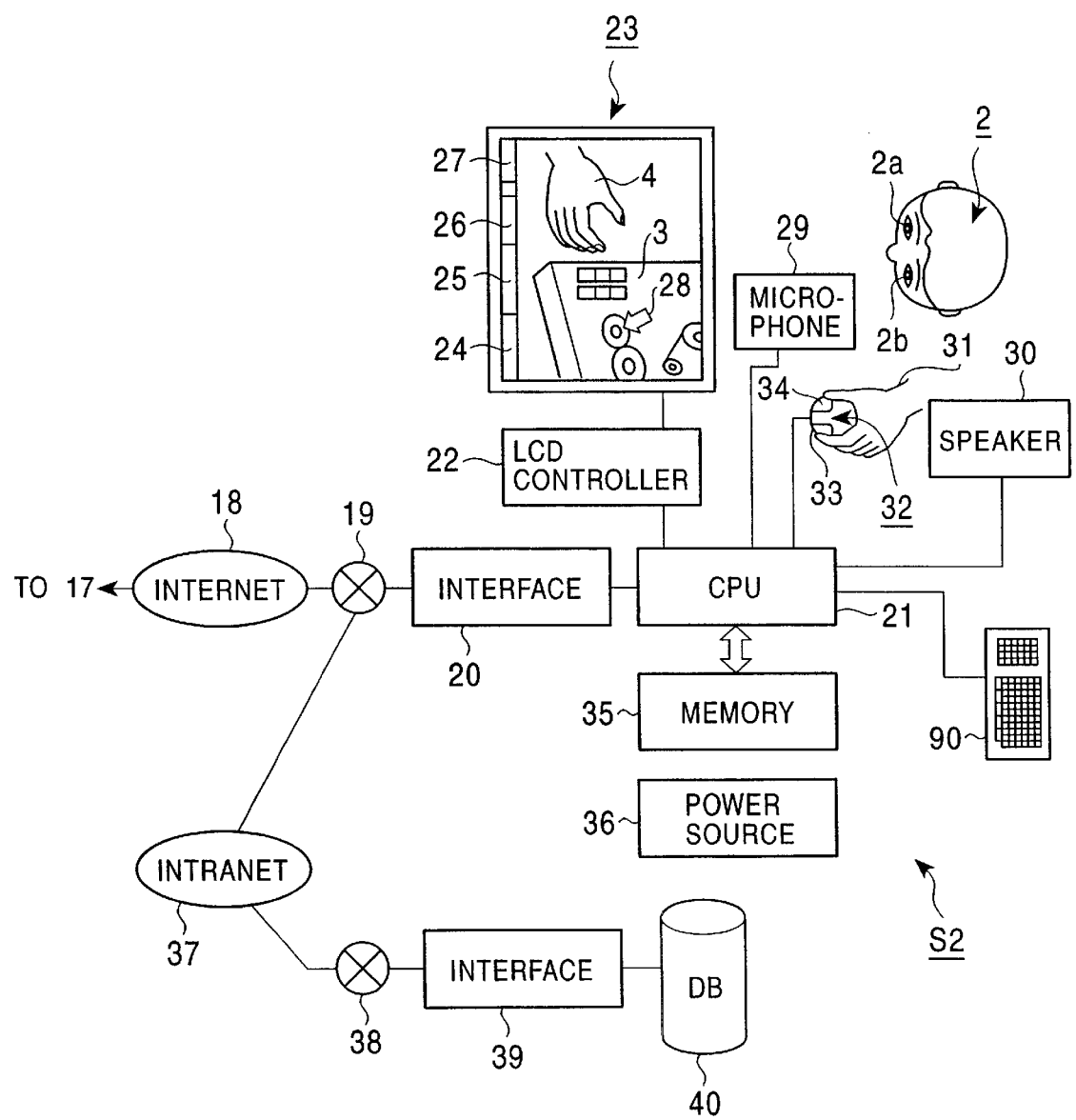
FIG. 2 illustrates a block diagram of a remote work supporting system on an instructor (second operator) side according to the first embodiment of the present invention.
Figure 3:
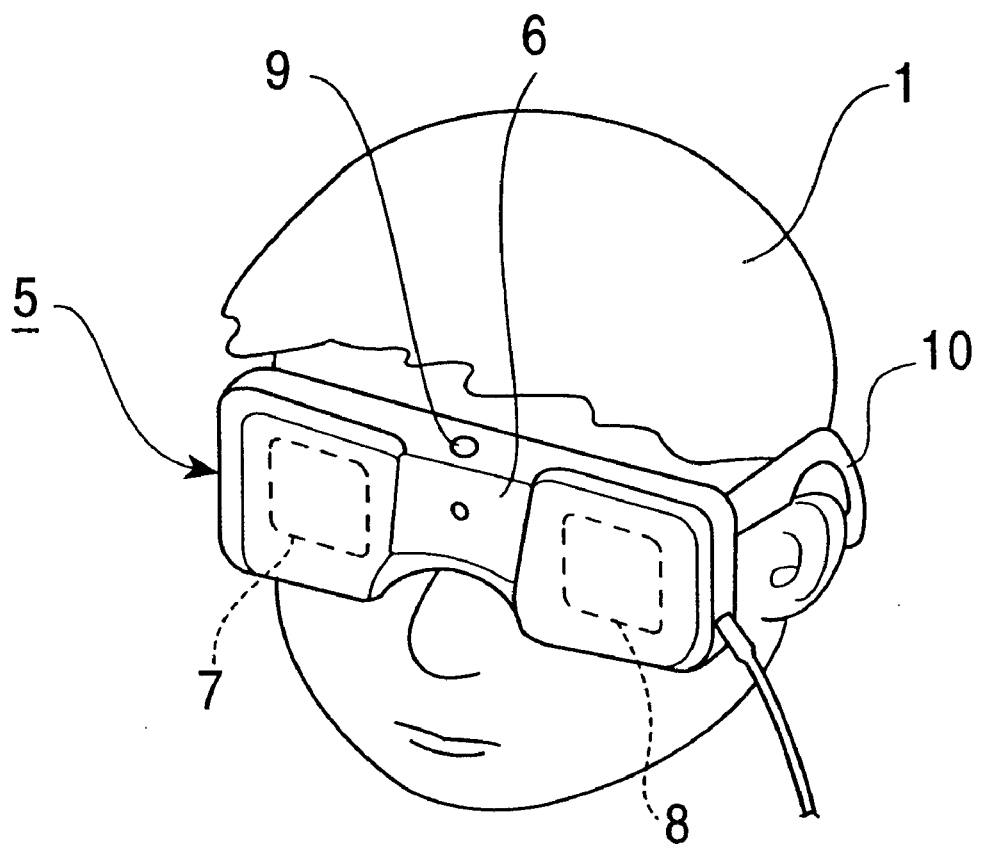
FIG. 3 illustrates an operator terminal in use in the first embodiment.
Figure 4:
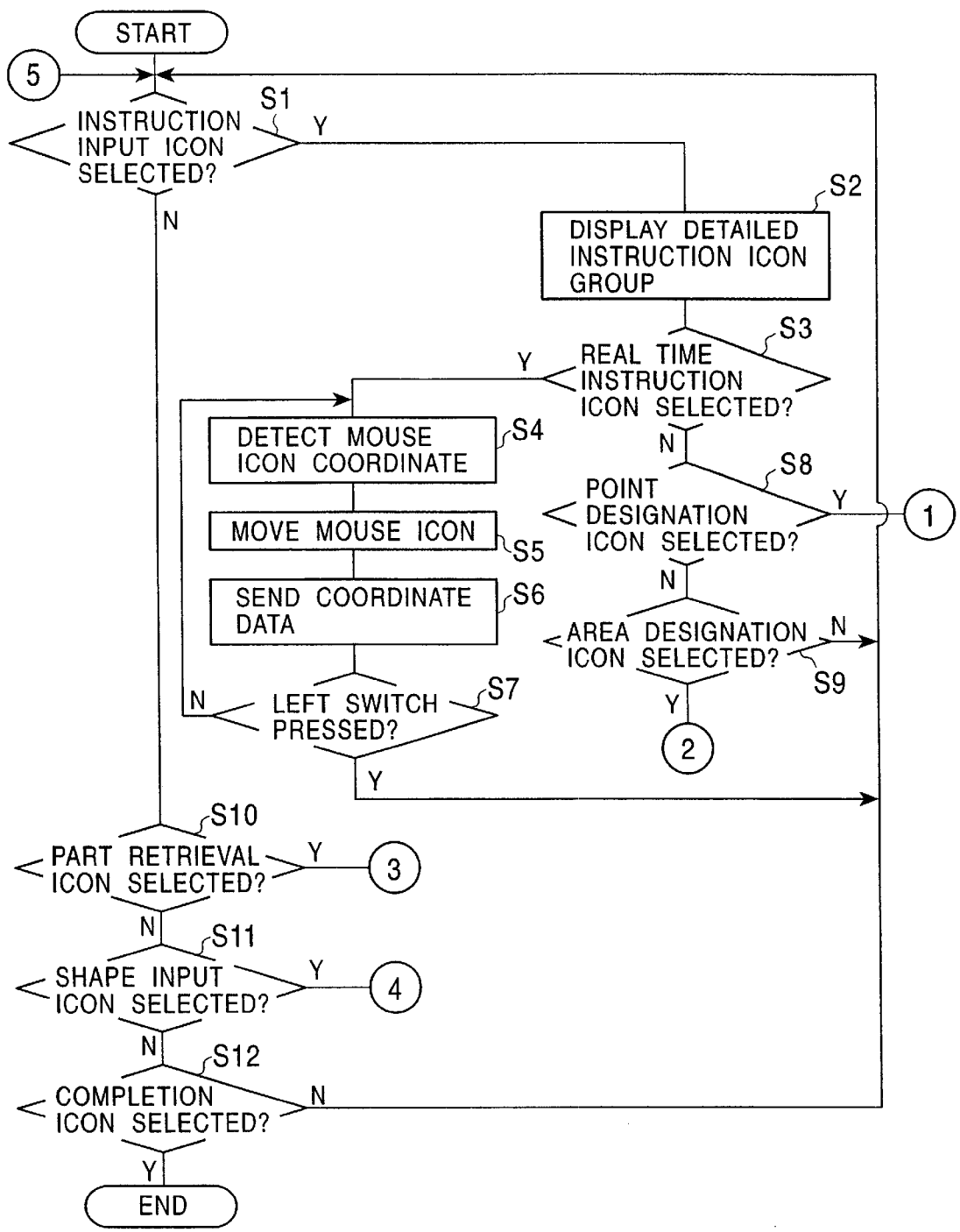
FIG. 4 is a first flowchart showing operations of the remote work supporting system according to the first embodiment.

Referring to FIGS. 1 to 3, reference numeral 1 designates an operator who actually works on a working object, 1a the right eye of the operator 1, 1b the left eye of the operator, 2 an instructor such as a designer or a design engineer in a design section, 2a the right eye of the instructor, 2b the left eye of the instructor, 3 a machine to be worked on by the operator (working object), 4 the right hand of the operator, S1 a terminal for the operator 1, and S2 a terminal for the instructor 2.

The machine 3 includes a first switch 3a, second switch 3b, motor gear 3c, output gear 3d meshing with the motor gear 3c, timing belt 3e, tension pulley 3f, first pulley 3g and second pulley 3h. The timing belt 3e engages over the first and second pulleys 3g and 3h and tension pulley 3f.

Reference numeral 5 denotes an image input device, 6 a camera, which is a means for photographing the machine 3, 7 a first LCD, 8 a second LCD, 9 a microphone, which is a first voice input means for inputting operator's voice, 10 a speaker, which is a first voice output means, 11 an image input unit, 12 and 22 LCD controllers, 13 and 21 CPUs, 14 and 35 memories, 15 and 36 power supplies, 16, 20 and 39 interfaces, 17, 19 and 38 modems, 18 the internet which is a communication network extending between the modems 17 and 19, 23 an LCD, 24 an icon for inputting instructions, 25 an icon for retrieving parts, 26 an icon for inputting shapes, 27 an icon for completion, 28 a mouse icon, 29 another microphone, which is a second voice input means for inputting an instructor's voice, 30 another speaker, which is a second voice output means, 31 the left hand of the instructor 2, 32 a mouse, which is an operation unit operated by the instructor 2, 33 a left switch, 34 a right switch, 37 an intranet, 40 a database and 90 a keyboard.

With the above described remote work supporting system, an image of the machine 3 photographed by the camera 6, including the right hand 4 of the operator 1, is displayed on the first and second LCDs 7 and 8, and the operator 1 sees the displayed image. The first and second LCDs 7 and 8 constitute a first display unit, and LCD 23 constitutes a second display unit. The camera 6 is located at an approximate center between the right and left eyes 1a and 1b of the operator 1.

The first LCD 7 is situated at a position facing the right eye 1a and the second LCD 8 at a position facing the left eye 1b. It should be noted that the first and second LCDs 7 and 8 may be combined to a single large LCD such that it will be subjected to the operator's face. However, use of the separate LCDs 7 and 8 makes the image input device 5 compact and lightweight. Therefore, when the operator 1 wears the image input device 5 as illustrated in FIG. 3, he or she does not feel uncomfortable or have the image input device 5 slid on the face.

An image of the machine 3 on the operator side, i.e., an image photographed by the camera 6 on the operator terminal S1 side, is converted to a digital signal by the image input unit 11 and sent to the instructor side, i.e., the instructor terminal S2 located at a remote place, in the form of image information via CPU 13, interface unit 16, modem 17, internet 18 and modem 19. This image information is displayed on LCD 23 for the instructor 2. Since the camera 6 is positioned to have approximately the same angle to the machine 3 as the operator's view, the instructor 2 can see the machine on the screen of LCD 23 at the same angle as the operator 1. Accordingly, the operator 1 and instructor 2 can share the image information of the machine 3.

A method of inputting work directions (job instructions) into the image information, which is shared by the operator 1 and instructor 2, will be described.

LCD 23 displays the mouse icon 28 at an arbitrary position as work instructions when the instructor 2 operates the mouse 32 with the left hand 31, and a group of icons including the instruction input icon 24 for allowing the instructor 2 to input the instructions, the part retrieving icon 25 for the instructor 2 to retrieve parts, the shape input icon 26 for the instructor 2 to input a shape of a part, and the completion icon 27 in an upper area of the screen as another work instructions. In this connection, CPU 13 includes a first work instruction displaying and processing means (not shown) and CPU 21 includes a second work instruction displaying and processing means (not shown). These display and process means are used to indicate the mouse icon 28 and the group of other icons.

The instructor 2 operates the mouse 32 to select one or more icons among the instruction input icon 24, part retrieval icon 25 and shape input icon 26. Subsequently, the instructor 2 inputs instructions in accordance with commands indicated on the display.

Figure 8:
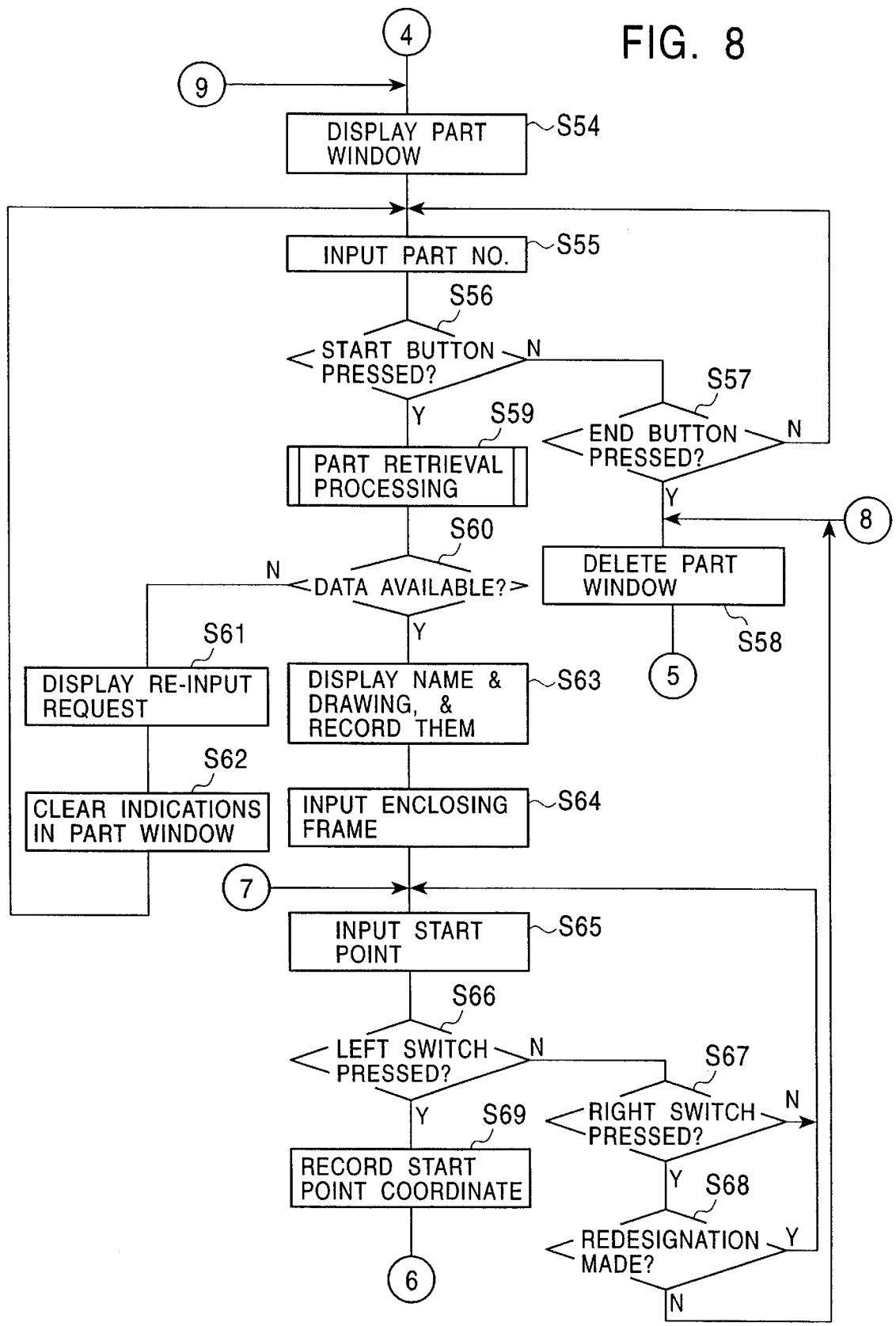
FIG. 8 illustrates a fifth flowchart.
Figure 9:
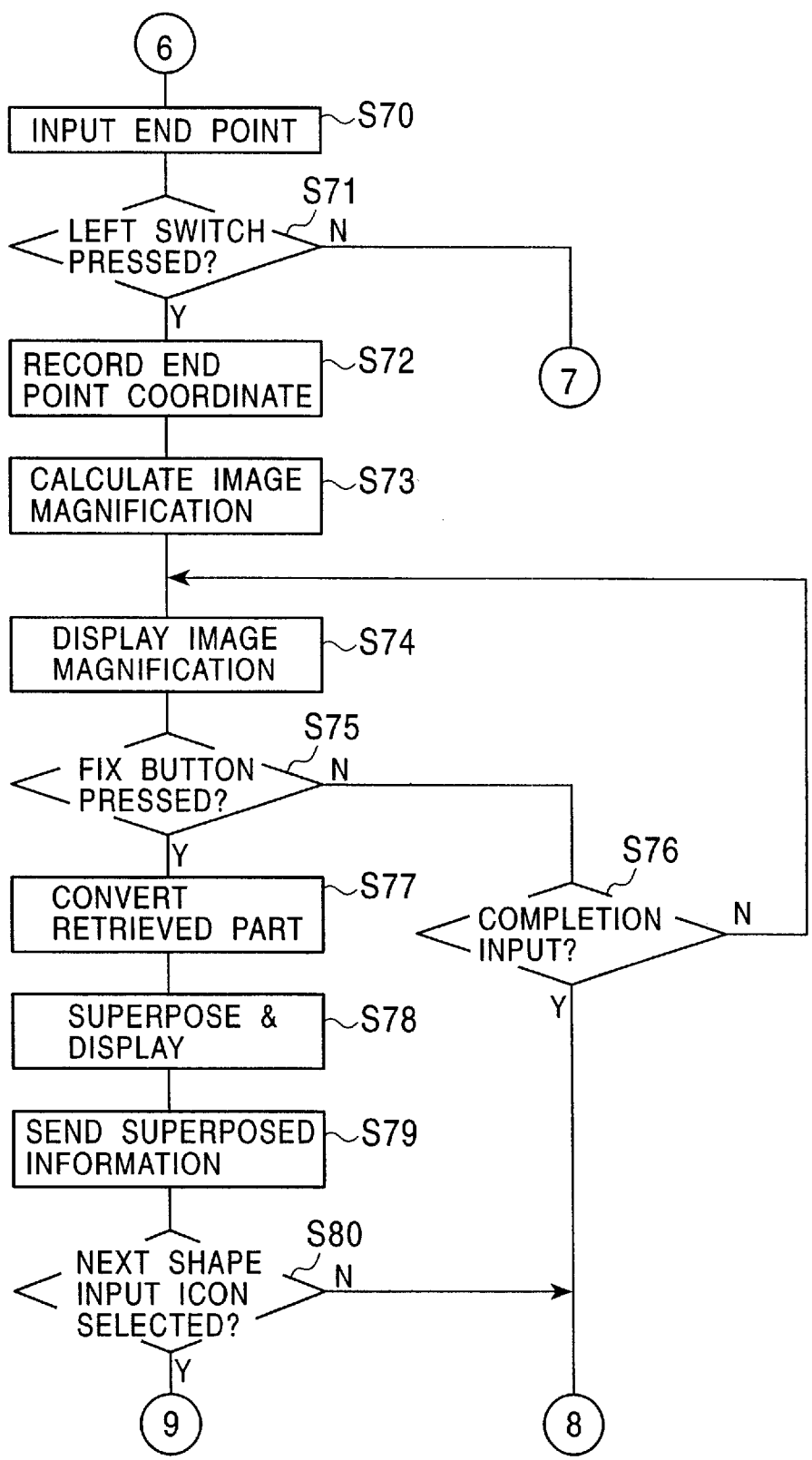
FIG. 9 illustrates a sixth flowchart.
Figure 10:
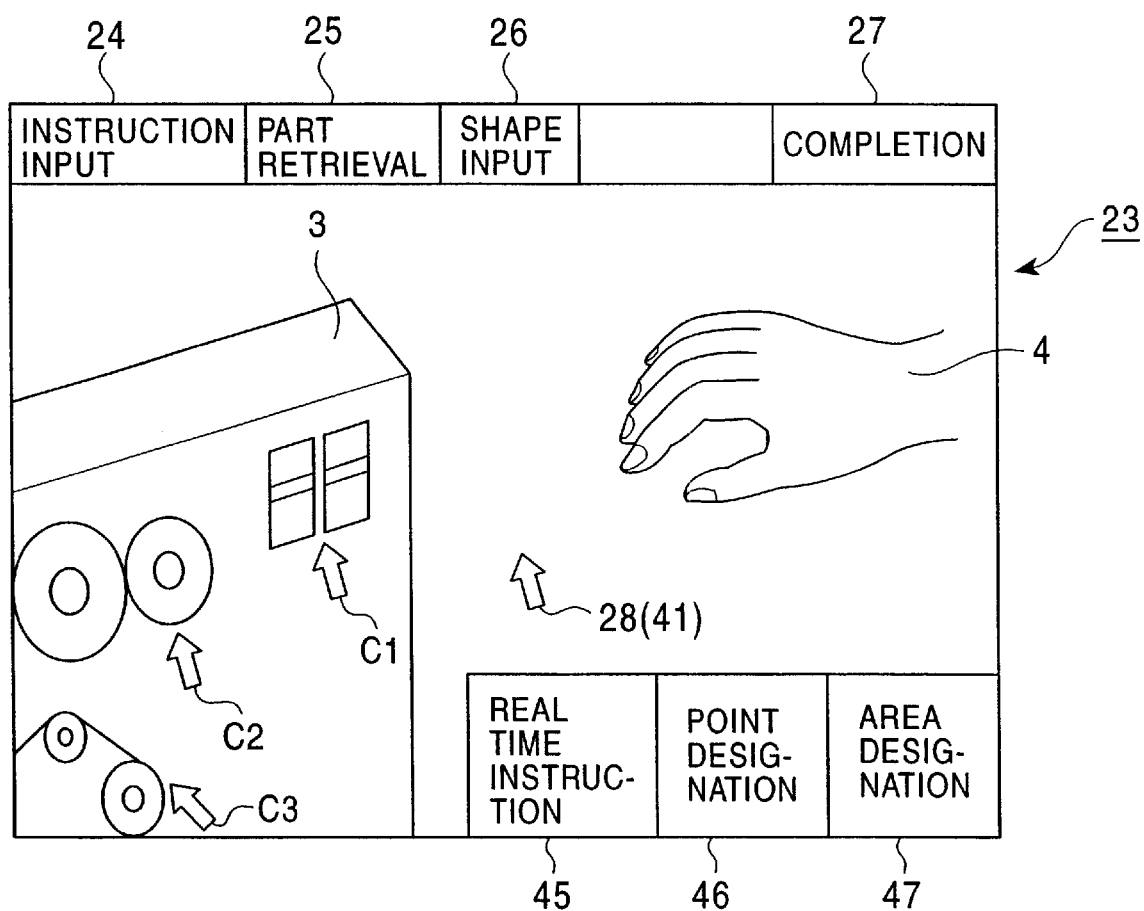
FIG. 10 illustrates an example of an LCD screen when a point designation icon is selected in the first embodiment.
Figure 11:
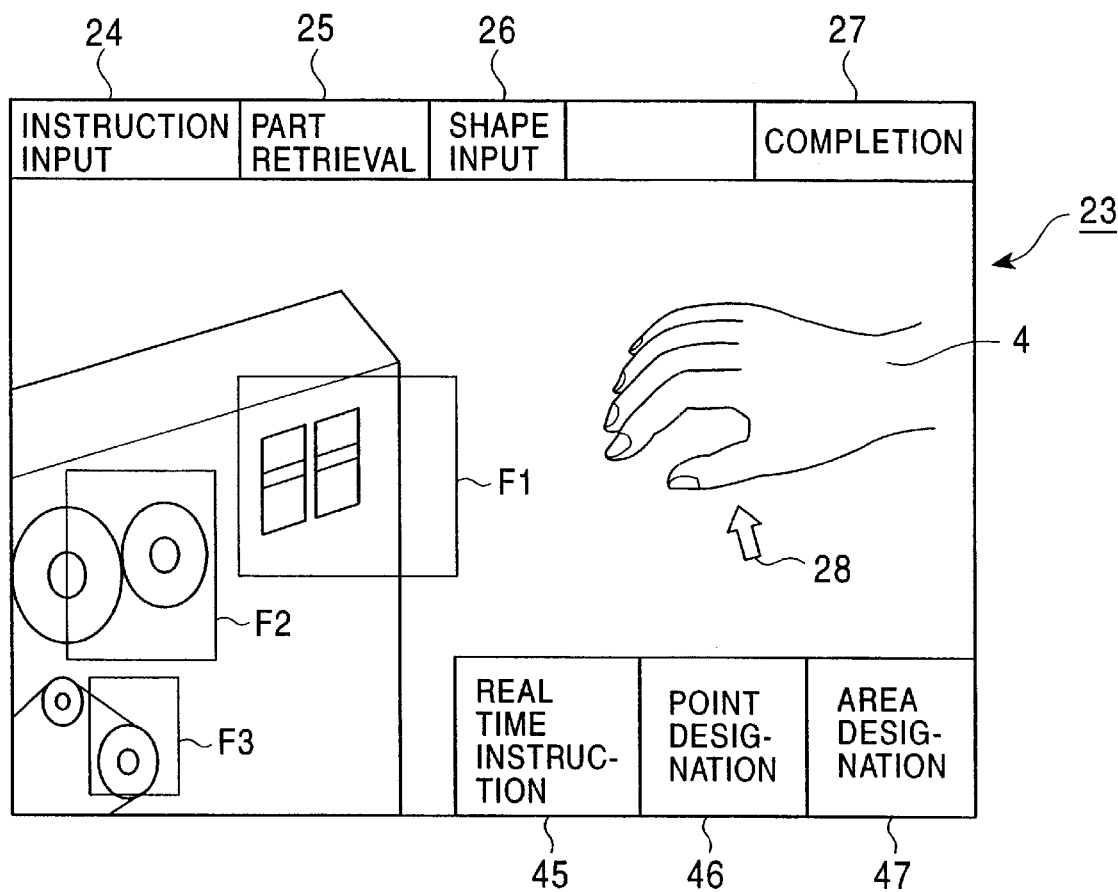
FIG. 11 illustrates an example of the LCD screen when an area designation icon is selected in the first embodiment.
Figure 12:
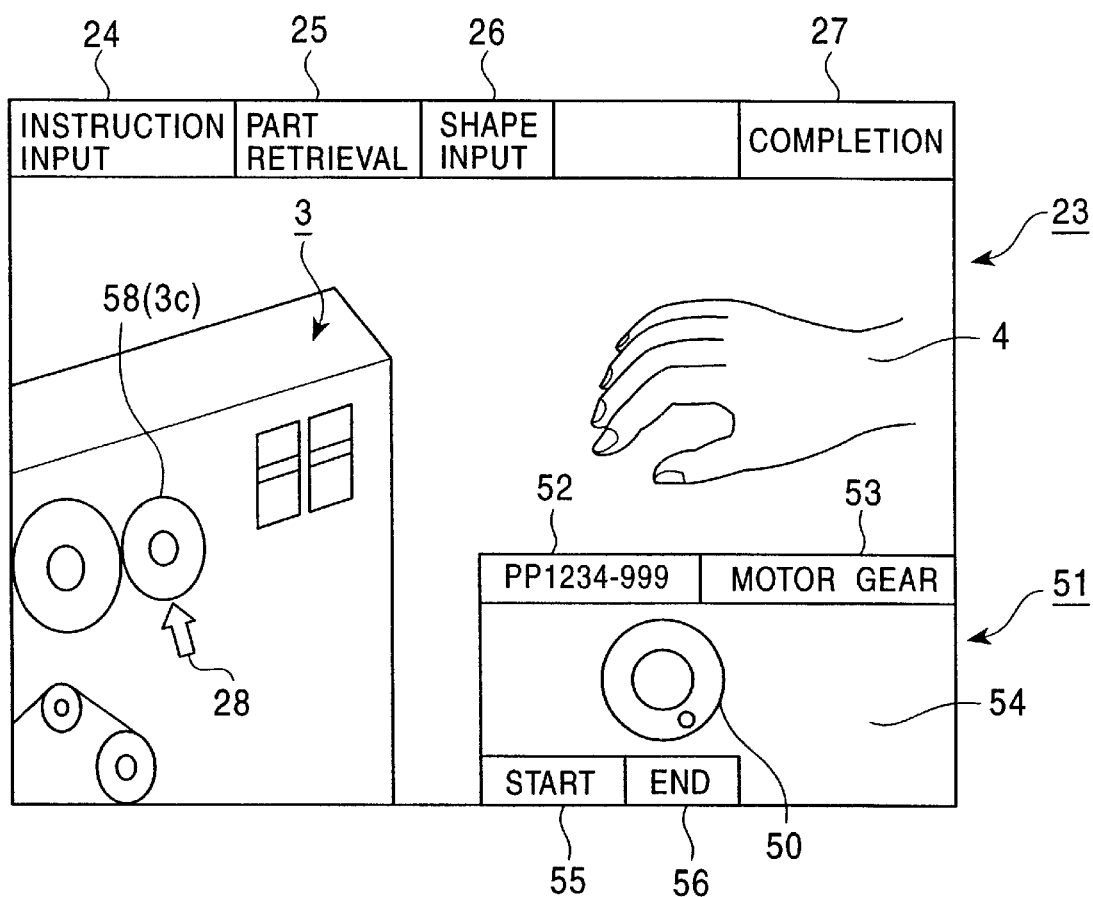
FIG. 12 illustrates an example of the LCD screen when a part retrieval icon is selected in the first embodiment.
Figure 13:
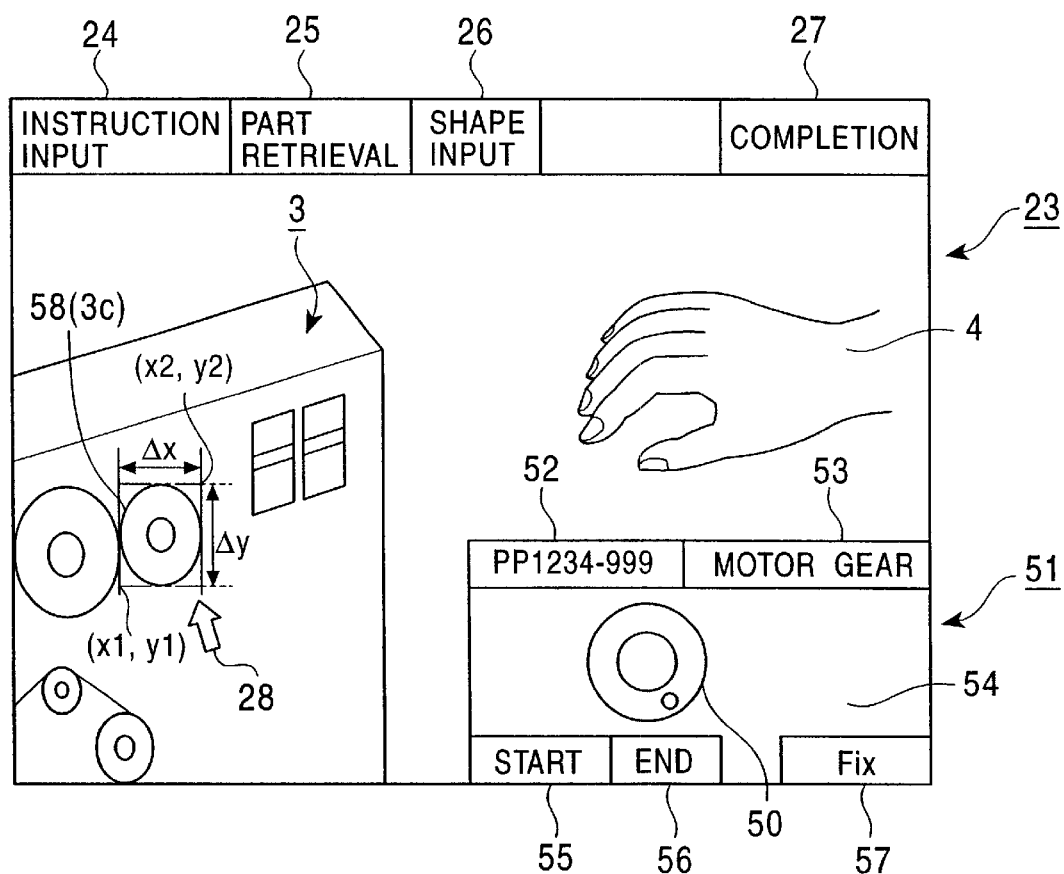
FIG. 13 illustrates an example of the LCD screen when a shape input icon is selected in the first embodiment.
Figure 14:
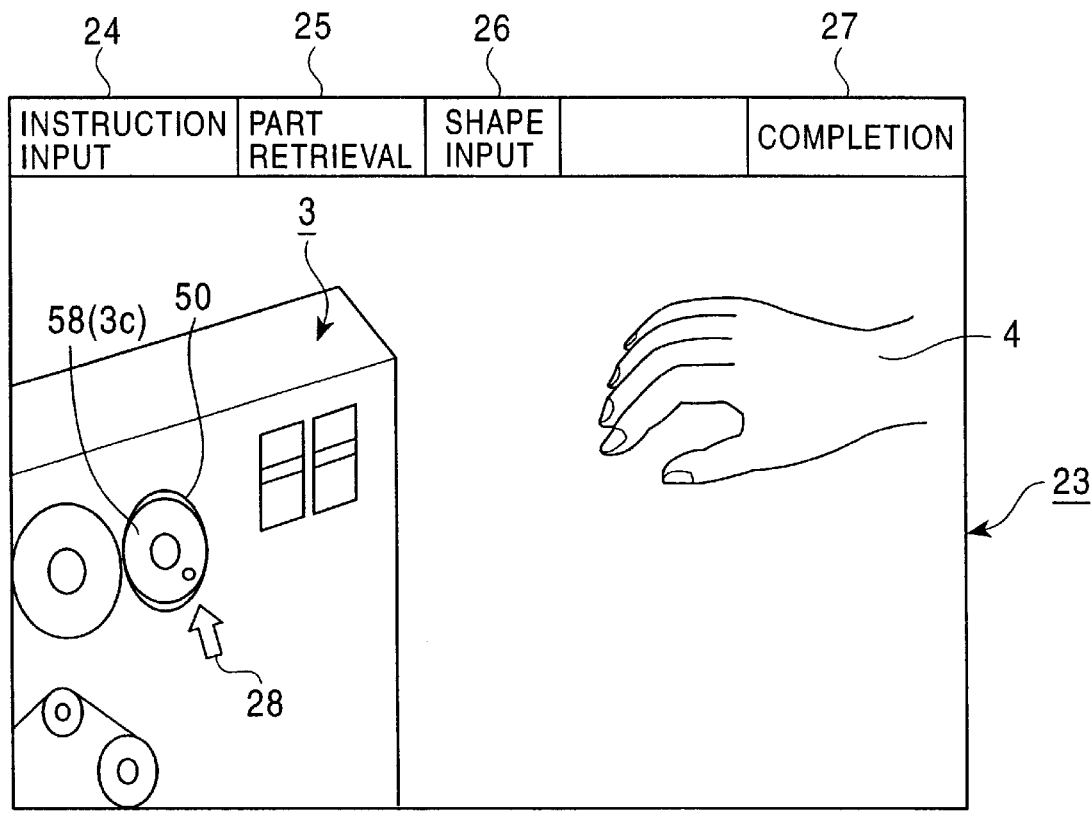
FIG. 14 illustrates another example of the LCD screen when the part retrieval icon is selected in the first embodiment.

FIGS. 4 to 9 in combination illustrate a flowchart showing an operation of the remote work supporting system according to the invention, FIG. 10 illustrates the LCD screen when a point specification icon is selected, FIG. 11 illustrates the LCD screen when an area specification icon is selected, FIG. 12 illustrates the LCD screen when the part retrieval icon is selected, FIG. 13 illustrates the LCD screen when the shape input icon is selected, and FIG. 14 illustrates another LCD screen when the shape input icon is selected.

When the instructor 2 (FIG. 2) selects the instruction input icon 24 (Step S1), the group of detailed instruction icons including a real time instruction icon 45, point specification icon 46 and area specification icon 47 are displayed in a lower right area on the screen of LCD 23 as illustrated in FIG. 10 (Step S2).

When the instructor 2 then selects the real time instruction icon 45 from the group of icons (Step S3), coordinate values (x, y) of the mouse icon 28 are detected (Step S4). Subsequently, if the instructor 2 moves the mouse icon 28 (Step S5), coordinate values (x, y) of the mouse icon 28 after the movement are detected and sent to CPU 13 (FIG. 1) via the internet 18 (Step S6). CPU 13 starts up a mouse icon display program, which is stored in the memory 14 beforehand, and displays the mouse icon on the first and second LCDs 7 and 8 using the coordinate data (x, y). Accordingly, the operator 1 can confirm the work instructions from the instructor 2 located at a remote place by watching the mouse icon indicated on the first and second LCDs 7 and 8.

Figure 5:
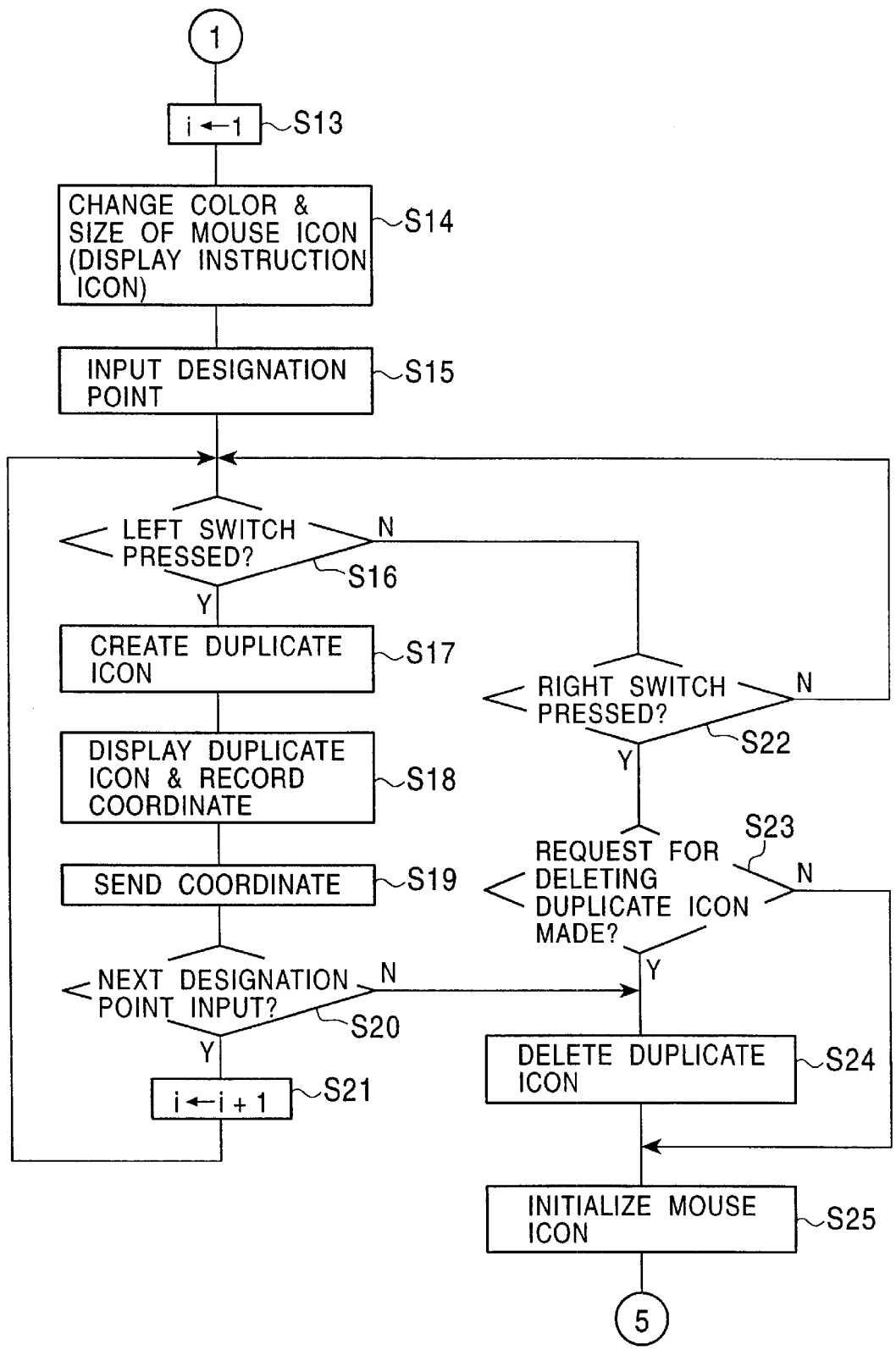
FIG. 5 illustrates a second flowchart.

If the instructor 2 selects the point specification icon 46 (Step S8), the color and size of the mouse icon 28 are changed on LCD 23 by a function of CPU 21 shown in the flowchart of FIG. 5 (Step S14). As a result, an instruction icon 41 is prepared and displayed instead of the mouse icon 28 as illustrated in FIG. 10. The instructor 2 then operates the mouse 32 to move the instruction icon 41 and presses the left switch 33 at an instruction point, at which the instructor expects the operator 1 to do the work (Steps S15 and S16).

This makes a duplicate of the instruction icon 41 (Step S17), and the duplicate icon Ci (i=1, 2, ... ) indicating the instruction point is fixedly displayed on LCD 23 at the coordinate of the instruction point at which the left switch 33 has been pressed. The coordinate (Xi, Yi) of the copied icon Ci is stored in the memory 35 together with the value i indicating the order of instruction point (Step S18). Then, the coordinate (Xi, Yi) and value i are sent to CPU 13 via the internet 18 as the image information (Step S19). Upon receiving these data, CPU 13 starts up a duplicate icon display program, which is stored in the memory 14 beforehand, and displays the duplicate icon Ci and value i on the first and second LCDs 7 and 8 based on the coordinate (Xi, Yi) and value i.

When the instructor 2 explains the work directions to the operator 1, he or she can arbitrarily specify a target portion of the machine 3 with the duplicate icon Ci so that the operation is simplified. Further, the operator 1 can confirm the work directions of the instructor 2 by looking at the duplicate icon on the first and second LCDs 7 and 8.

Figure 6:
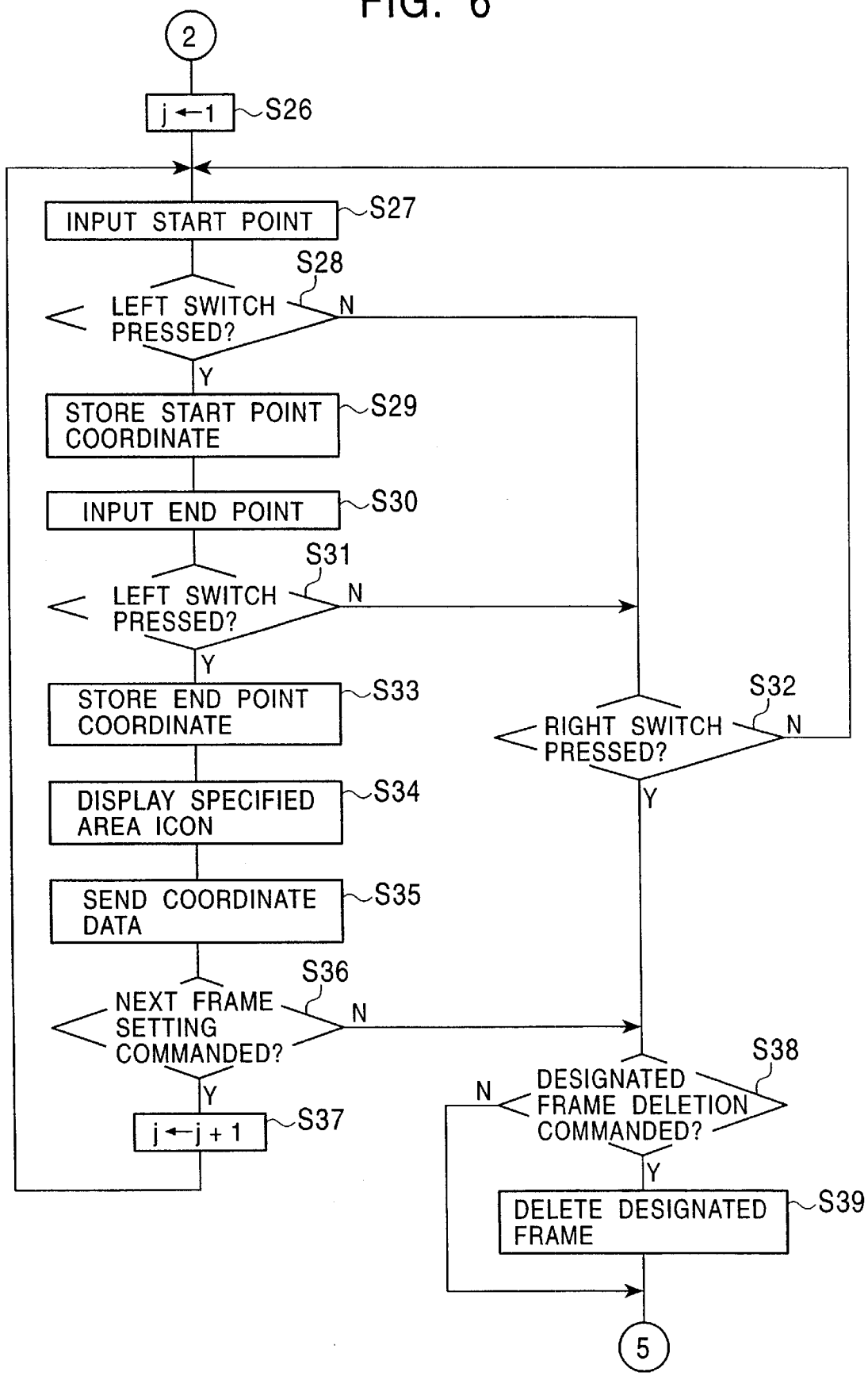
FIG. 6 illustrates a third flowchart.
Figure 7:
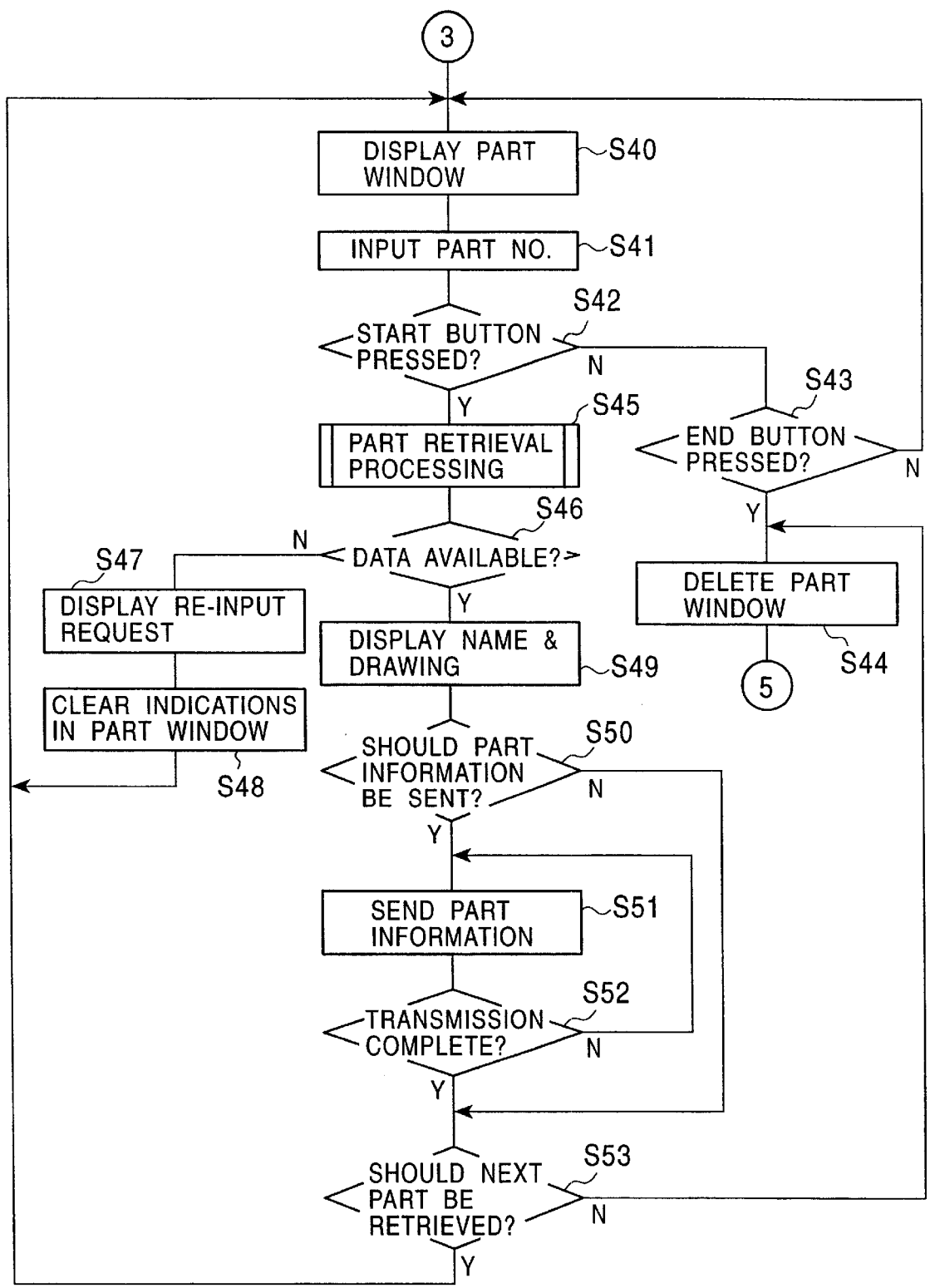
FIG. 7 illustrates a fourth flowchart.

If the instructor 2 selects the area specification icon 47 (Step S9), it is possible to set an instruction area at which the instructor expects the operator 1 to do the work on LCD 23 by a function of CPU 21 shown in the flowchart of FIG. 6. To this end, the instructor 2 operates the mouse 32 to move the mouse icon 28 in order to input a start point of the instruction area (Step S27). Subsequently, as the left switch 33 is pressed (Step S28), the coordinate (X1j, Y1j) of the start point is stored in the memory 35 (Step S29). The instructor 2 moves the mouse icon 28 again to input an end point of the instruction area (Step S30), and then presses the left switch 33 (Step S31) to store the coordinate (X2j, Y2j) of the end point into the memory 35 (Step S33). The instruction area is determined based on the coordinates (X1j, Y1j) and (X2j, Y2j), and an instruction area icon Fj (j=1, 2, ... ) indicating the instruction area is displayed on LCD 23 as shown in FIG. 11 (Step S34). The value j indicating the order of the specified area is stored in the memory 35 together with the coordinates (X1j, Y1j) and (X2j, Y2j). The coordinates (X1j, Y1j) and (X2j, Y2j) and value j are sent to CPU 13 over the internet 18 as the image information (Step S35). CPU 13 then starts up a specified area icon display program which is stored in the memory 14 beforehand, and displays the specified area icon Fj and value j on the first and second LCDs 7 and 8 based on the coordinates (X1j, Y1j) and (X2j, Y2j) and value j.

When the instructor 2 explains the work directions to the operator 1, he or she can arbitrarily specify a desired portion of the machine 3 with the icon Fj. Therefore, the operation is facilitated. Further, the operator 1 is able to confirm the work directions given from the instructor 2 by seeing the specified area icon Fi on the first and second LCDs 7 and 8.

If the instructor 2 selects the part retrieval icon 25 (Step S10), a part window 51 is displayed at a lower right section of LCD 23 as illustrated in FIG. 12. In this case, the instructor 2 moves the mouse icon 28 to a part number input zone 52 in accordance with a function of CPU 21 shown in a flowchart of FIG. 7, thereby making the part number input zone ready to accept a part number. The instructor 2 then inputs the number of a part, which he or she wants to seek, with the keyboard 90. After that, the instructor 2 moves the mouse icon 28 to a start button (START) 55 in the part window 51 and presses the start button 55 with the right or left switch 34 or 33. This causes a part retrieving means (not shown) of CPU 21 to perform a part retrieving process. If data is available, a name of the part corresponding to the part number is displayed in a name area 53 and a diagram of the part is displayed in a figure area 54.

The part retrieving process is carried out based on part data stored in the memory 35. If, however, the part data is not stored in the memory 35, the part retrieving process is conducted using part data stored in the data base 40 through the intranet 37. When desired part data is found in the data base 40, that data (data of the target part 50) is downloaded to the memory 35.

Upon completion of the part retrieval, the part window 51 displays a Y/N command to determine necessity/no necessity of part information transmission. If the instructor 2 selects "necessity" (Y) in this command, the part information is transmitted to the memory 14 over the internet 18 as the image information and stored therein. Further, the first and second LCDs 7 and 8 show the same part window as the part window 51.

Reference numeral 56 designates an end button (END), and 58 a target part, which is actually incorporated in the machine 3 and worked on by the operator 1.

As described above, when the instructor 2 explains the work instructions to the operator 1, he or she can specify the name and configuration of the target part 58 so that the work is facilitated. In addition, the operator 1 can confirm the work instructions of the instructor 2 by looking at the part window displayed on the first and second LCDs 7 and 8.

For example, as illustrated in FIG. 12, it is possible to easily recognize that the shape of the target part 58 is different from that of the retrieved part 50; the retrieved part 50 has a screw hole whereas the target part 58 does not.

If the instructor 2 selects the shape input icon 26 (Step S11), the part window 51 is displayed at the lower right corner of LCD 23 as illustrated in FIG. 13. The instructor 2 moves the mouse icon 28 to the part number input section 52 in accordance with a function of CPU 21 shown in a flowchart of FIGS. 8 and 9, thereby bringing the part number input area 52 ready to accept a part number. Subsequently, the instructor 2 inputs a number of a desired part with the keyboard 90 (Step S55). The instructor 2 then moves the mouse icon 28 to the start button 55 displayed in the part window 51 and presses the start button 55 with the right or left switch 34 or 33 (Step S56) to cause the part retrieving means to perform the part retrieval (Step S59). If corresponding data is found, a name of the part having the input part number is displayed in the name area 53 and a diagram of the retrieved part 50 is displayed in the diagram area 54 (Step S63).

The part retrieval is carried out using the part data stored in the memory 35, but if the part data is not stored in the memory 35, the part retrieval may be carried out using the part data stored in the database 40 through the intranet 37. When data of a target part is found in the database 40, that data is downloaded to the memory 35.

Now, a process and function of CPU 21 shown in the flowchart of FIGS. 8 and 9 to calculate a display magnification applied to the target part 58 in order to overlap the retrieved part 50 on the target part 58 will be described.

First, the instructor 2 moves the mouse icon 28 to the target part 58 and specifies the size (dimensions) of the target part 58. To do this, as illustrated in FIG. 13, the instructor 2 sets a frame to surround the target part 58, and stores the start point coordinate (x1j, y1j) and end point coordinate (x2j, y2j) of the frame by pressing the left switch 33 (Steps S64 to S72). Then, the lengths of the frame in the X and Y axis directions Δx and Δy are calculated from the stored coordinates (x1j, y1j) and (x2j, y2j) based on the number (M, N) of displayed pixels in LCD 23. The size of the target part 58 can be confirmed from data of the retrieved part 50. The image magnification Sx and Sy are calculated to overlap the retrieved part 50 on the target part 58 in LCD 23, based on correlation among the lengths Δx and Δy, part data and number of displayed dots of the mouse 32 (Step S73).

Specifically, the number of displayed pixels (M, N) on LCD 23, the number of pixels (m, n) of the camera 6, the pixel pitch (w, h) of the pixels (picture elements), an actual size (Lx, Ly) of the target part 58, etc. are known so that the image magnification Sx and Sy are calculated from the following equation based on the lengths Δx and Δy. The calculated image magnification Sx and Sy are displayed in the part window 51 (Step S74).

$$Sx = m \cdot w \cdot \Delta x / (M \cdot Lx)$$

$$Sy = n \cdot h \cdot \Delta y / (N \cdot Ly)$$

After confirming the image scaling Sx and Sy, the instructor 2a moves the mouse icon 28 to the fix button (Fix) 57 in the part window 51, and presses the fix button 57 with the left switch 33 or right switch 34 (Step S75). As a result, the retrieved part 50 displayed in the diagram section 54 is converted at the image scaling Sx and Sy as shown in FIG. 14 (Step S77), and overlapped on the target part 58 based on the start coordinate (x1j, y1j) and end coordinate (x2j, y2j) (Step S78).

In the meanwhile, the part data, coordinates (x1j, y1j) and (x2j, y2j) and image scaling Sx and Sy are sent to CPU 13 over the internet 18 as the overlap display and image information (Step S79). CPU 13 stores the overlap display information in the memory 14 and activates the shape input icon display program, which is stored in the memory 14 beforehand, to overlap-display the retrieved part over the target part displayed on the screens of the first and second LCDs 7 and 8 based on the part data, coordinates (x1j, y1j) and (x2j, y2j) and image scaling Sx, and Sy.

Thus, when the instructor 2 explains the work instructions to the operator 1, he or she can clarify differences between the target part 58 and retrieved part 50 so that the work is facilitated. Further, when the operator 1 has the work instructions, the time needed to seek drawings is reduced. It should be noted that reference numeral 4 designates the right hand of the operator 1, and 27 designates the completion icon.

Although the operator 1 and instructor 2 can share the image information in the above described example, it is difficult to set timing for sending the image information to the instructor terminal S2 from the operator terminal S1, and to the operator terminal S1 from the instructor terminal S2. It is difficult for the instructor 2 to grasp the operator's condition.

In order to cope with this, the microphone 9 and speaker 10 are connected to CPU 13 on the operator side, and the microphone 29 and speaker 30 are connected to CPU 21 on the instructor side. Therefore, when the image information is send and received between the operator terminal S1 and instructor terminal S2, the operator 1 can use the microphone 9 to input a request for work instructions with his or her voice. The instructor 2 can confirm the work instructions request from not only the message displayed on LCD 23 but also the voice output from the speaker 30. For this reason, the first voice information transmitting and processing means (not shown) is provided in CPU 13, and the second voice information transmitting and processing means (not shown) is provided in CPU 21 such that the first voice information transmitting and processing means can send voice information to the instructor 2 and the second voice information transmitting and processing means can send the voice information to the operator 1.

Upon conforming the work instruction request auditorily, the instructor 2 can input the work position with his or her voice using the microphone 29 when sending the work instructions by image. Thus, the operator 1 can confirm the work instructions in the form of not only the image but also the voice output from the speaker 11.

In this manner, the information is sufficiently shared between the operator 1 and instructor 2 so that the time needed to analyze causes of trouble can be reduced and the manufacturing cost for products can also be reduced.

In the first embodiment, incidentally, when the operator 1 checks loosening of bolts and belts, the instructor 2 can recognize the checking operation of the operator 1, but cannot obtain the information about how loose they are in terms of force. Therefore, a second embodiment of the present invention will deal with an arrangement that is equipped with a test machine for the operator 1 to examine the screw and belt looseness. It should be noted that similar reference numerals are assigned to similar elements in the first and second embodiments and their description will be omitted.

Figure 15:
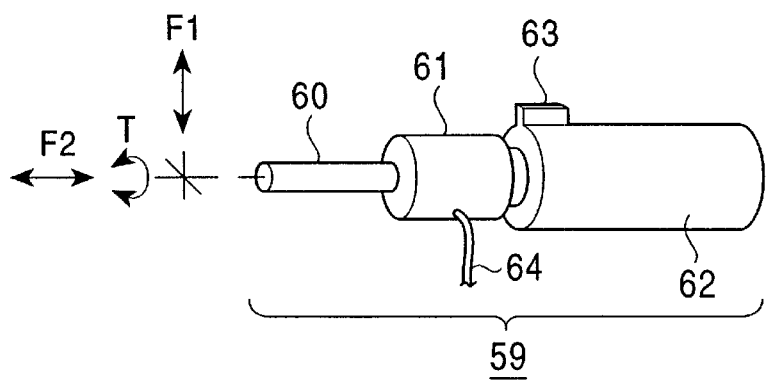
FIG. 15 shows a perspective view of a testing device employed in a second embodiment.
Figure 16:
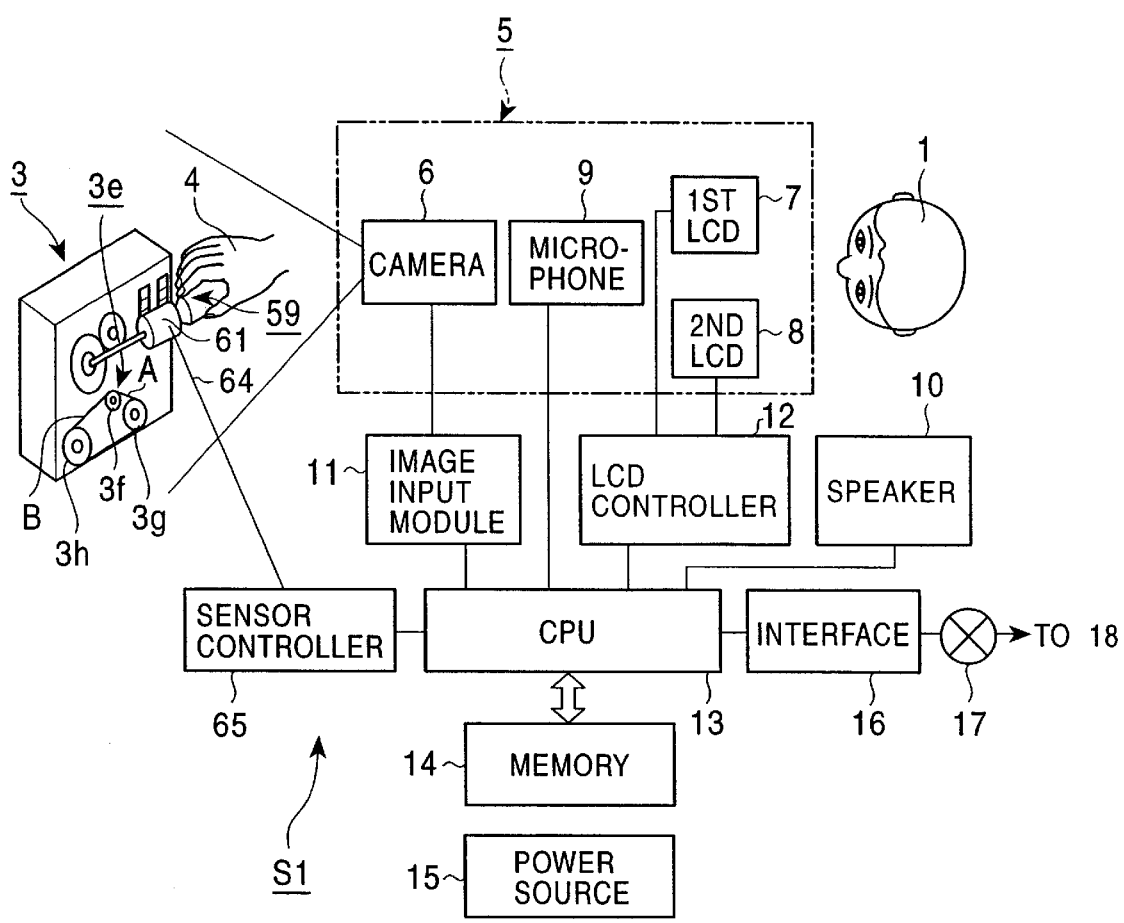
FIG. 16 shows a block diagram of a remote work supporting system on the operator side according to the second embodiment.
Figure 17:
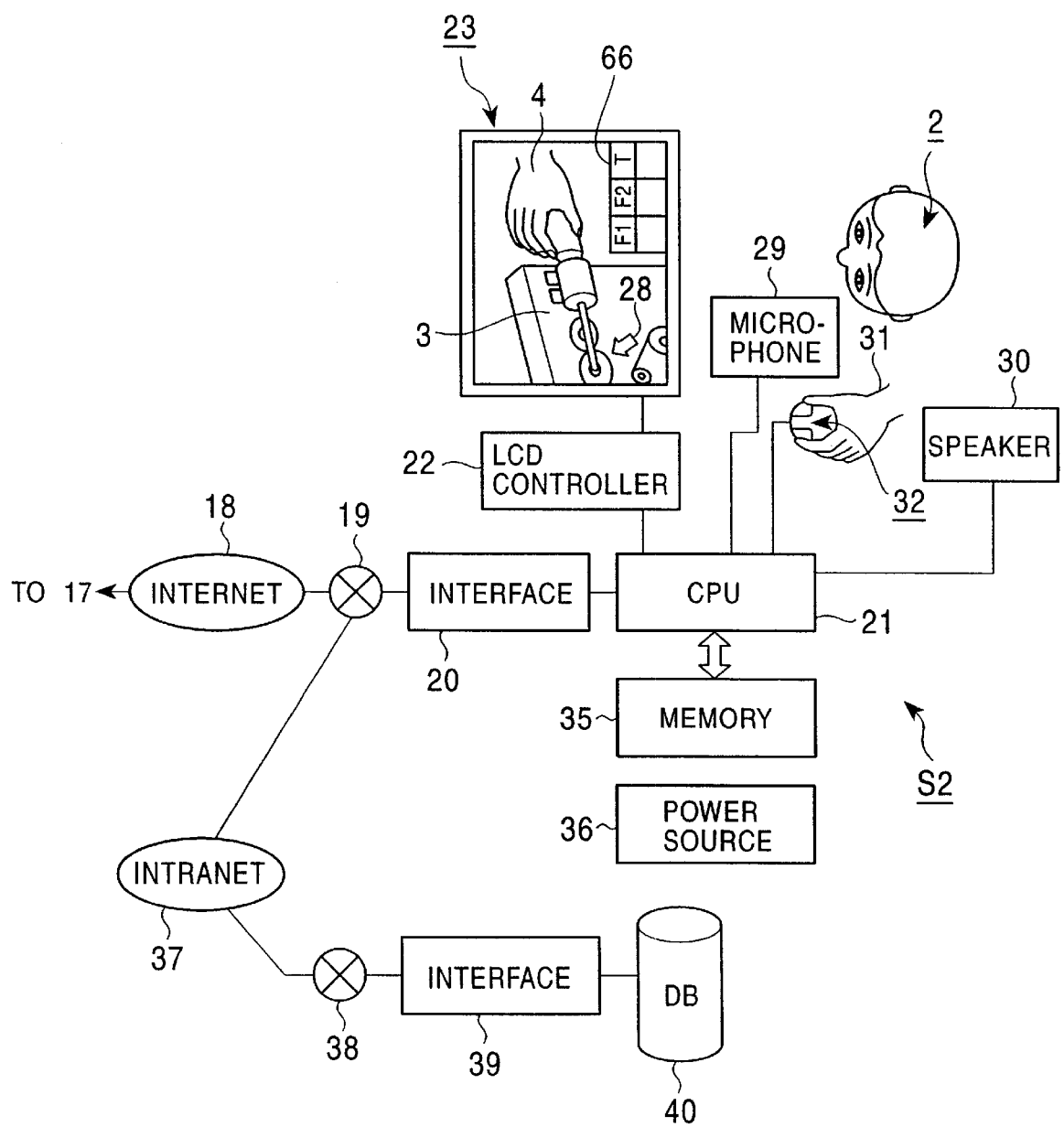
FIG. 17 shows a block diagram of a remote work supporting system on the instructor side according to the second embodiment.
Figure 18:
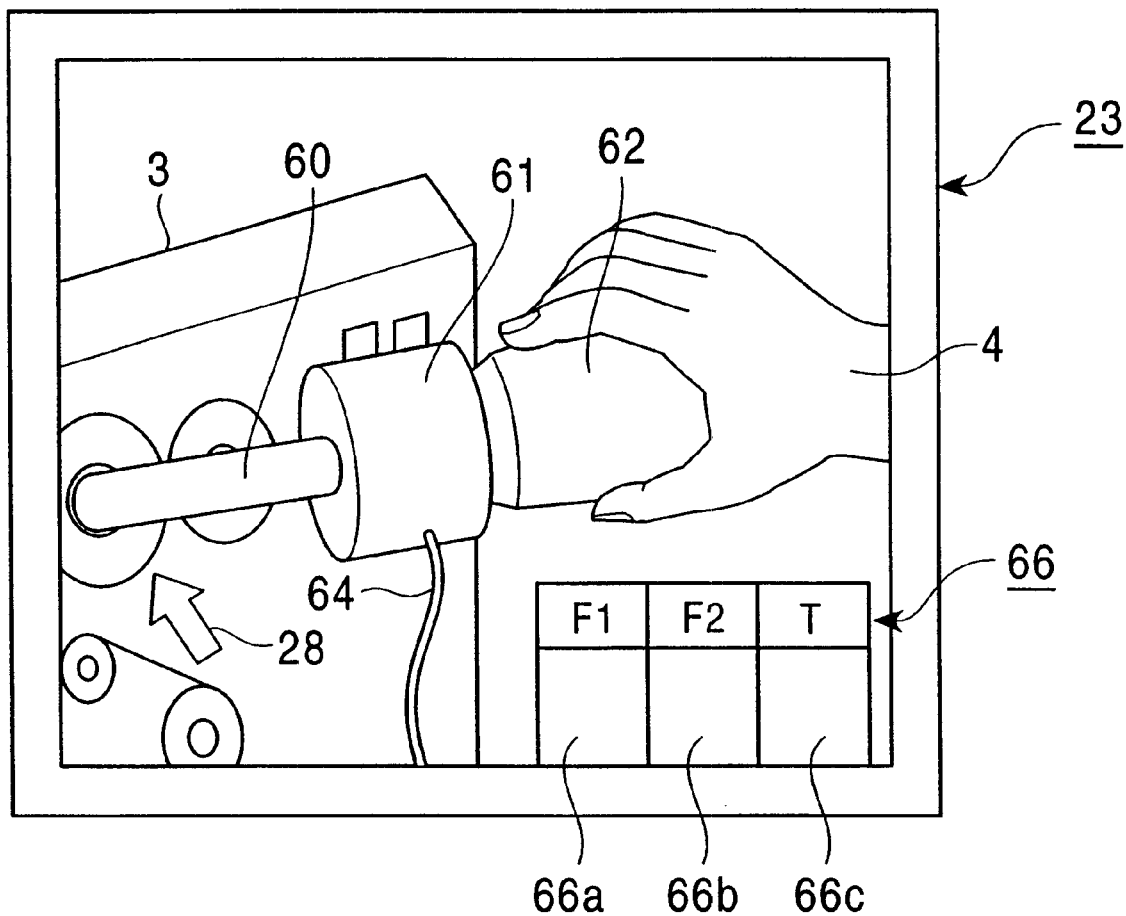
FIG. 18 shows an example of an LCD screen employed in the second embodiment.

FIG. 15 illustrates a perspective view of the test machine employed in the second embodiment, FIG. 16 illustrates a first conceptual view of a remote work supporting system in the second embodiment, FIG. 17 illustrates a second conceptual diagram of the remote work supporting system, and FIG. 18 illustrates an example of the screen of LCD in the second embodiment.

In these drawings, reference numeral 59 denotes a test machine for testing a particular portion of the machine 3 to be examined, 60 a rod, 61 a force sensor, 62 a handle, 63 a mark for examination direction, 64 a signal cable, 65 a sensor controller, and 66 a force information displaying window.

The test machine 59 has the force sensor 61 between the rod 60 and handle 62 that can measure two forces F1 and F2 and one rotational torque T. The force F1 is a force acting in a bending direction of the rod 60 (direction including the test direction mark 63 and the center line of the rod 60), the force F2 is a force acting in an axial direction of the rod 60, and the rotational torque T is a torque acting about the axial direction of the rod 60.

The sensor 61 generates voltages in proportion to the forces F1 and F2 and rotational torque T when these forces and torque are applied to the rod 60. These voltages are sent to the sensor controller 65 via the signal line 64 and converted into digital signals. The digital signals are then transmitted to CPU 13. CPU 13 activates a force measuring program which is stored in the memory 14 beforehand to convert the digital signals to forces, and stores them in the memory 14 as the force data of the test result. It should be noted that based on the stored force data a force information display window is created on the first and second LCDs 7 and 8, which the operator 1 is watching as a first operator, according to a force data display program stored in the memory 14 beforehand. In a number display section of the force information display window, are displayed the force data about the forces F1 and F2 and rotational torque T.

The force data is also downloaded to the memory 35 over the internet 18 in accordance with instructions from the instructor 2, who is a design engineer in charge (second operator). Subsequently, a force information display window 66 is created in LCD 23, which the instructor 2 is watching, according to a force data display program stored in the memory 35 beforehand. As illustrated in FIG. 18, the force data of the forces F1 and F2 and rotational torque T are displayed in number display sections 66a to 66c.

The digital signals obtained from the force sensor 61 via the sensor controller 65 may also be sent to CPU 21 of the instructor 2 over the internet 18, and the force data may be displayed in the number display sections 66a to 66c according to the force measuring program and force data display program stored in the memory 35 beforehand. A test information transmitting and processing means (not shown) is provided in CPU 13 for sending the digital signals to the instructor terminal S2.

In this instance, CPU 13 may activate the force measurement program and force data display program to display the force data in the number display sections of the first and second LCDs 7 and 8 based on the digital signals sent from the force sensor 61 via the sensor controller 65.

Therefore, the operator 1 and instructor 2 can simultaneously confirm the assembled condition of the machine 3 in a target area as the operator 1 causes a tip of the rod 60 of the test machine 59 to contact a particular portion of the machine 3 to be tested and the handle 62 to move in the test direction.

As illustrated in FIG. 16, it is also possible to measure tension of the timing belt 3e if the operator 1 matches the test direction of the force F1 with a tense direction of a portion A of the timing belt 3e between the tension pulley 3f and first pulley 3g and that of a portion B between the tension pulley 3f and second pulley 3h. In addition, it is feasible to easily confirm whether the measured tension is equal to the force F1, F2 in the force information display window of the first and second LCDs 7 and 8 or the force information display window 66 of LCD 23.

It should be noted that if necessary the instructor 2 retrieves measurement reference values for examination by the test machine 59 which are stored in the memory 35 or database 40 beforehand, and displays them in a margin outside the force information display window of the first and second LCDs 7 and 8 or the force information display window 66 of LCD 23. A measurement reference value retrieval means (not shown) is provided in CPU 21 to retrieve the measurement reference values. Further, a measurement reference value transmitting and processing means (not shown) is provided in CPU 21 to send the measurement reference values to the operator terminal S1. In this case, the operator 1 and instructor 2 can simultaneously confirm whether or not the force data is equal to the measurement reference values.

Moreover, since a duplicate icon, an instruction frame and the like are displayed in the first and second LCDs 7 and 8, the operator 1 can easily identify the part to be examined, particularly when the machine 3 has parts having the same configuration next to each other but one of them should be examined.

Now, a third embodiment of the present invention will be described.

Figure 19:
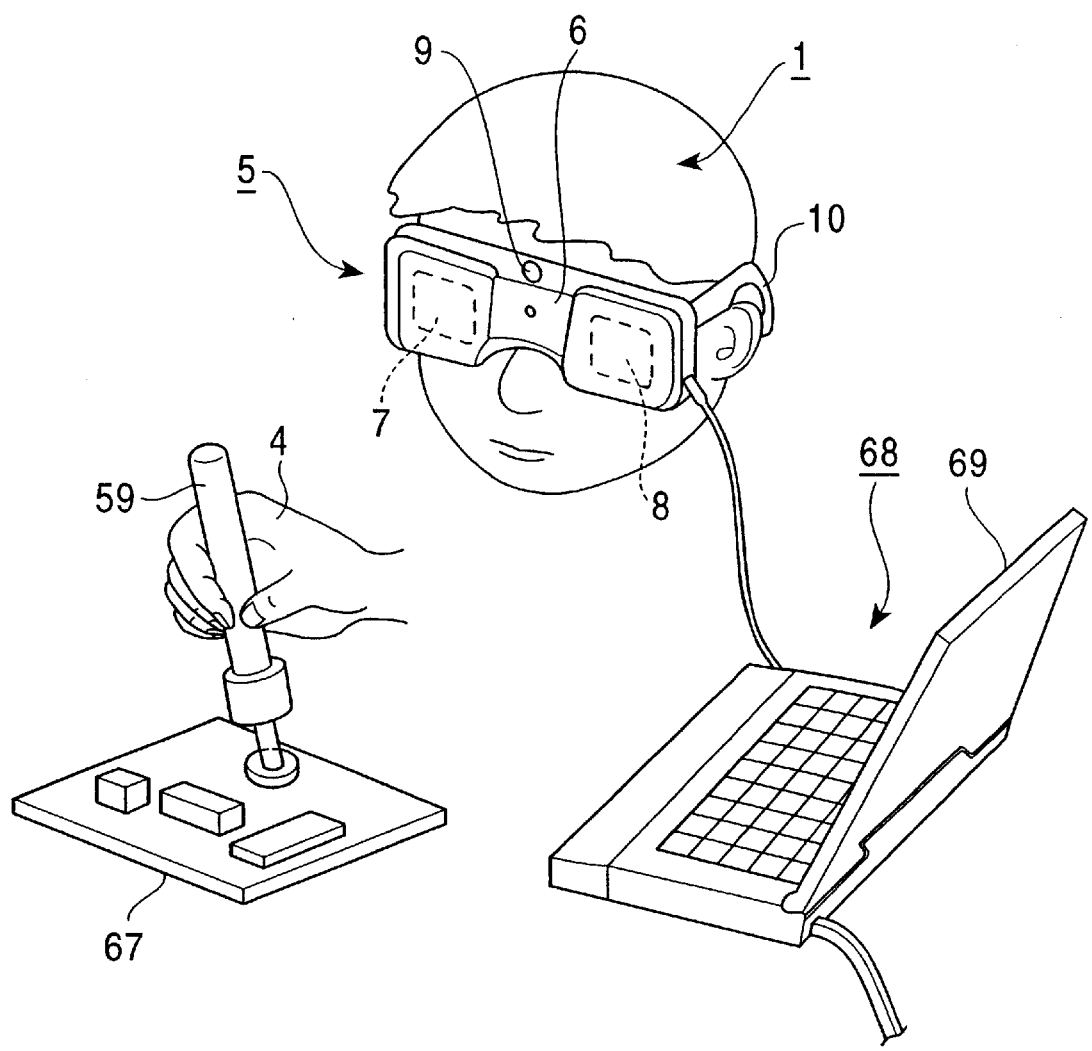
FIG. 19 shows a perspective view of a remote work supporting system according to a third embodiment.

Referring to FIG. 19, illustrated is a remote work supporting system according to the third embodiment.

In the drawing, reference numeral 67 designates a device to be handled by the operator, 68 an operator's personal computer, and 69 LCD. The operator (first operator) 1 wears the image input device 5 on his or her face. The image input device 5 includes the camera 6, first LCD 7, second LCD 8, microphone 9 and speaker 10. The operator 1 holds the test device 59 in the right hand 4, and examines the assembled condition of the test target 67 with the test device 59.

The camera 6 is located on the line of sight of the operator 1, i.e., at an approximate center between the right eye 1a and left eye 1b of the operator 1 (FIG. 1). The lens of the camera 6 are adapted to have the horizontal range of vision of 60° or more and the vertical range of vision of 40° or more such that the range of vision through the photographing substantially matches the range of vision through the two eyes of the operator 1.

An image of the target device 67 photographed by the camera 6 is converted to digital signals in an image input module (not shown) located in the image input device 5, and the digital signals are sent to the operator's personal computer 68 such that they are processed by CPU (not shown) of the personal computer 68. LCD 69 is utilized as an auxiliary display unit for the first and second LCDs 7 and 8, and can provide the image information to other operators at the work site.

In each of the foregoing embodiments, the image of the target product 3, 67 photographed by the single camera 6 is displayed in the first and second LCDs 7 and 8. Therefore, the operator 1 cannot feel (or understand) how far or close the image, which the operator 1 is watching, is apart from the operator. As a result, when the operator 1 extends his or her arm to reach the target object 3, 67 while watching the image in the same manner as if the operator was watching the target object by eyes, then the operator fails to reach the target object.

Likewise, since the image of the target product 3, 67 photographed by the single camera 6 is displayed in the single LCD 23, the instructor 2 cannot grasp the distance between the image and operator.

Now, a fourth embodiment that can cope with the above drawbacks will be described. In this embodiment, two cameras are provided for the right eye 1a and left eye 1b of the operator 1, and images of the target object 3, 67 photographed by the two cameras are displayed in two LCDs of the instructor terminal S2 (FIG. 2). Similar reference numerals are allotted to similar parts in the first and fourth embodiments and description of these parts will be omitted.

Figure 20:
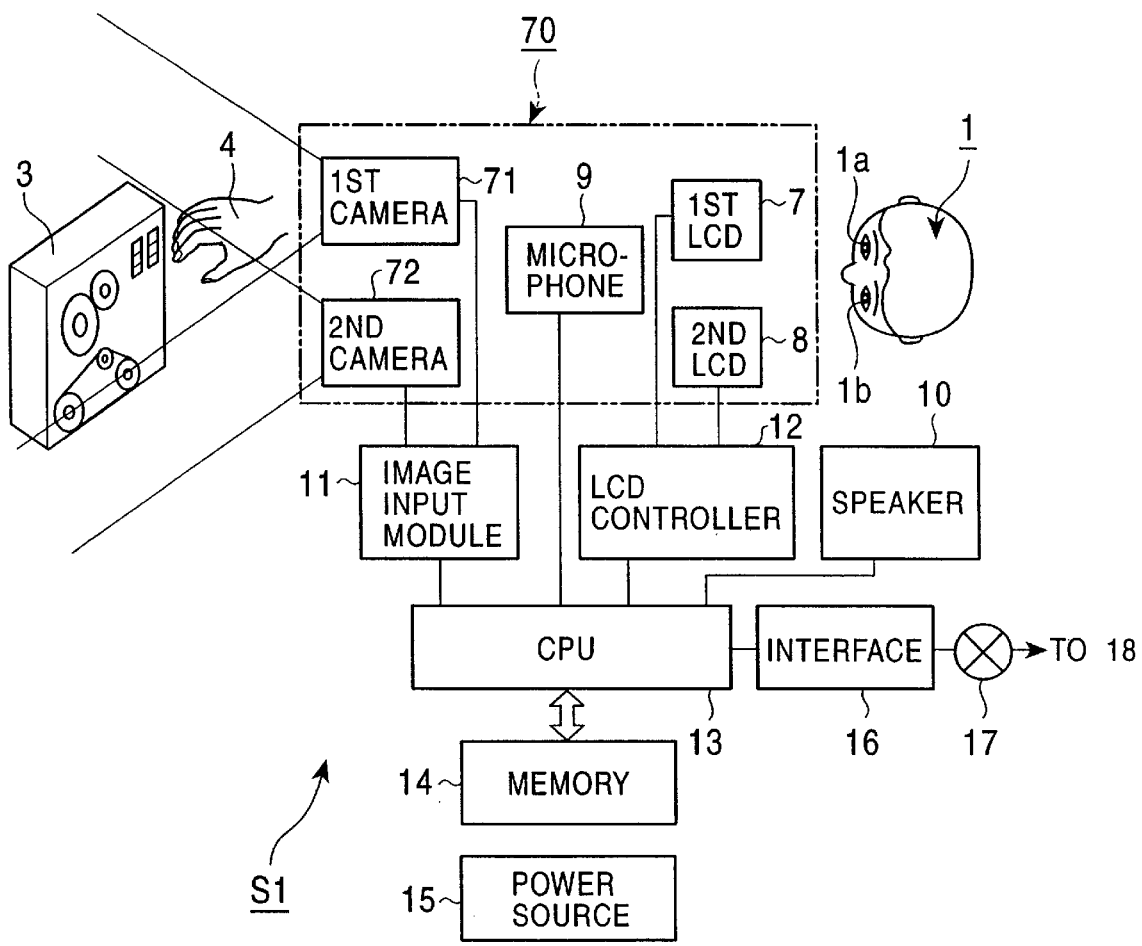
FIG. 20 shows a block diagram of a remote work supporting system on the operator side according to a fourth embodiment.
Figure 21:
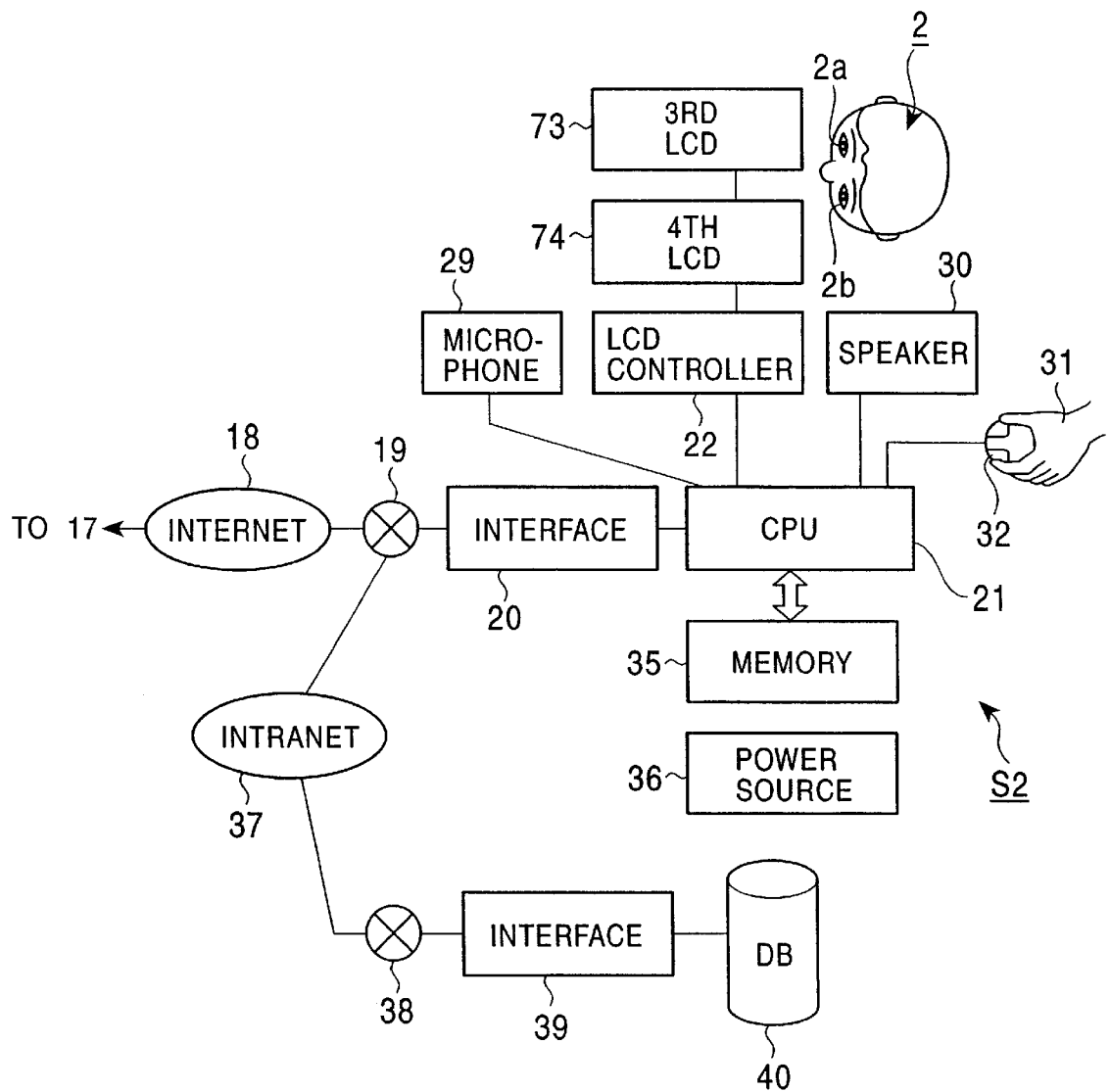
FIG. 21 shows a block diagram of a remote work supporting system on the instructor side according to the fourth embodiment.
Figure 22:
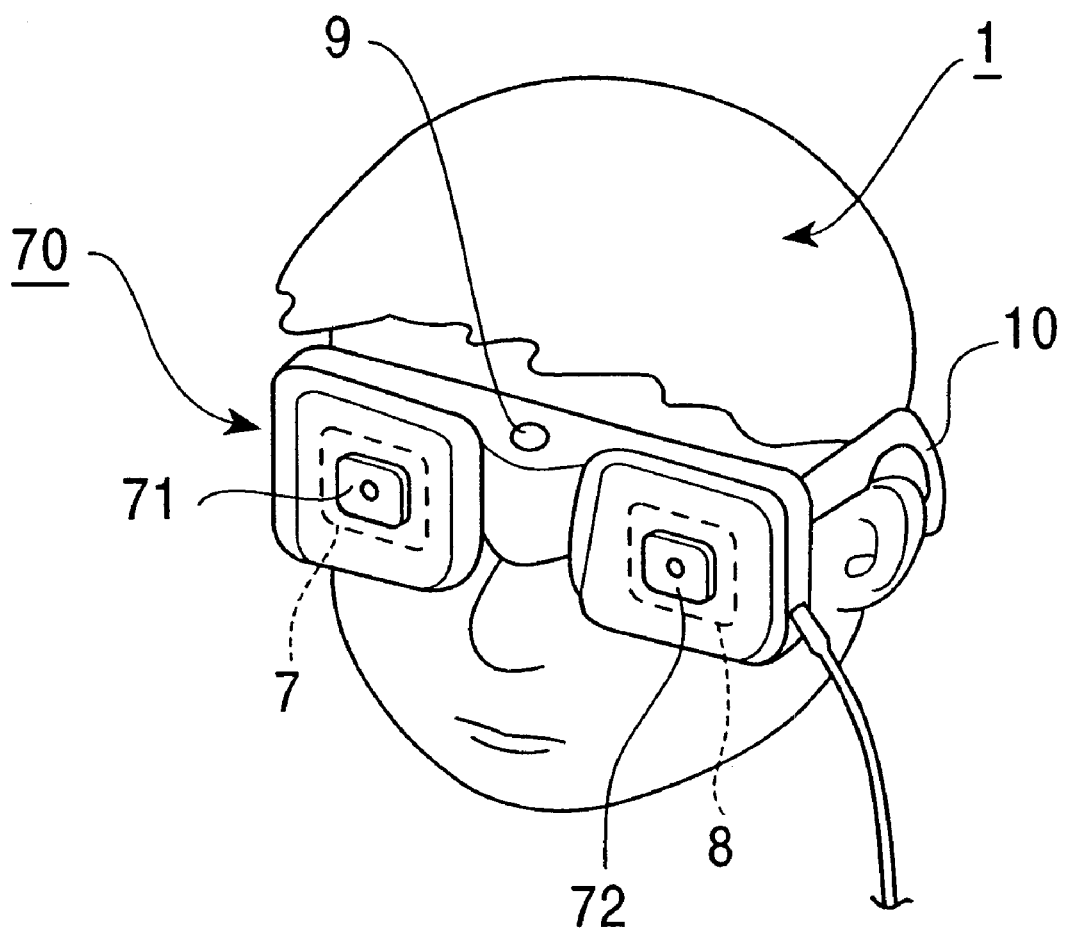
FIG. 22 shows a perspective view of an operator terminal in use according to the fourth embodiment.

FIG. 20 illustrates a first conceptual diagram of a remote work supporting system of the fourth embodiment, FIG. 21 illustrates a second conceptual diagram of the remote work supporting system of the same embodiment, and FIG. 22 illustrates the operator terminal worn by the operator.

In these drawings, an image input device 70 accepts a stereo image, the first LCD 7 is provided for the right eye 1a of the operator 1, the second LCD 8 is provided for the left eye 1b of the operator 1, a first camera 71 is a photographing means for the right eye 1a of the operator 1, a second camera 72 is another photographing means for the left eye 1b of the operator 1, a third LCD 73 is a second display provided for the right eye 2a of the instructor 2, and a fourth LCD 74 is a second display provided for the left eye 2b of the instructor 2.

Images photographed by the first and second cameras 71 and 72 are displayed in the first and second LCDs 7 and 8 respectively so that the operator 1 can see two images having parallax. Accordingly, the operator 1 can feel the distance in the image. Thus, when the operator 1 tries to reach the target machine 3 with his or her hand while watching the image, there will be no discrepancy between the image and actuality, and the operator can successfully reach the target machine.

Likewise, the images photographed by the first and second cameras 71 and 72 are displayed in the third and fourth LCDs 73 and 74 respectively so that the instructor 2 can see two images having parallax and have a sense of distance in the image.

It should be noted that a cubic image having parallax may be displayed in a single LCD. To this end, a cubic image display and process means (not shown) is provided in at least one of CPUs 13 and 21 that displays a cubic image in at least one of LCDs on the operator side and that on the instructor side. In this case, the cubic image displayed in at least one of the LCDs on the operator and instructor sides provides a sense of distance.

In each of the above described embodiments, the operator 1 is expected to have some knowledge and experiences about the target machine 3, 67 (FIG. 19) and/or the work to be done on the target machine. Therefore, if the operator 1 does not have any knowledge and experiences, work instructions from the instructor 2 may not be understood by the operator 1.

A fifth embodiment of the present invention, which will be described below, deals with a case where the operator 1 and instructor 2 will be put in the same work environment; before the operator 1 starts the instructed work, the instructor 2 assembles and/or examines the target machine 3, 67, and sends the assembling and examining information to the operator 1 so that the operator 1 can experience necessary works prior to the instructed work. Similar reference numerals are used to designate similar parts in the fourth and fifth embodiments, and their description will be omitted.

Figure 23:
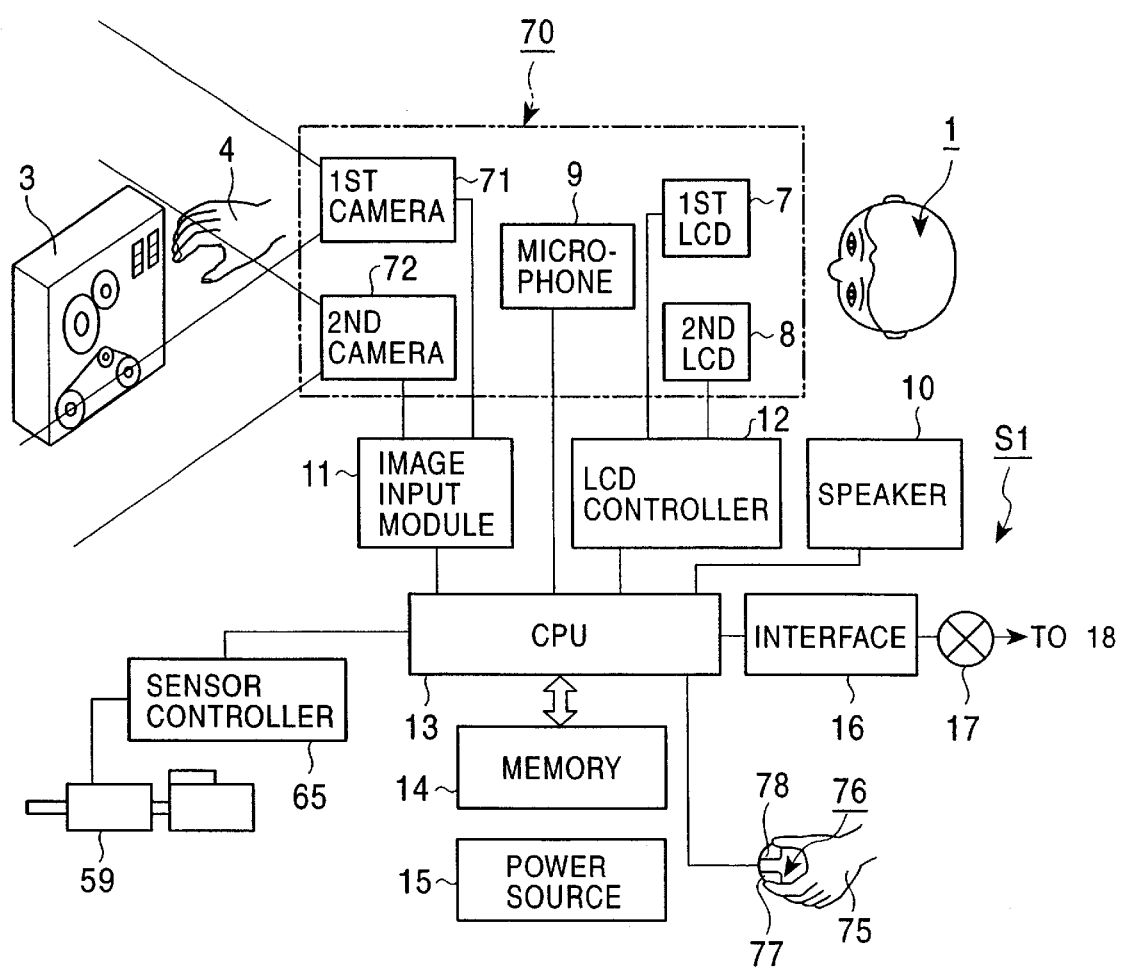
FIG. 23 shows a block diagram of a remote work supporting system on the operator side according to a fifth embodiment.
Figure 24:
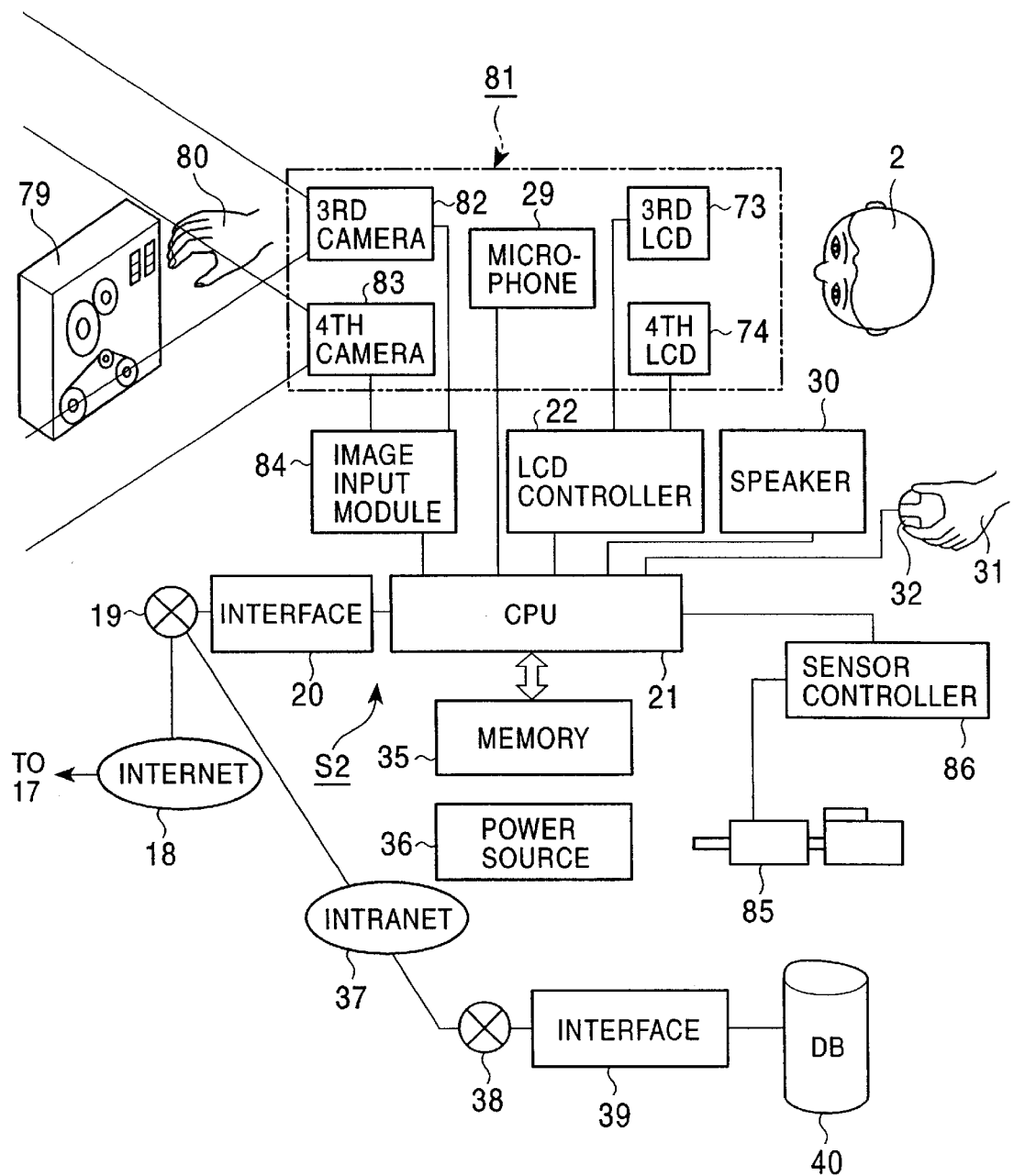
FIG. 24 shows a block diagram of a remote work supporting system on the instructor side according to the fifth embodiment.

FIG. 23 shows a block diagram of a remote work supporting system located on the operator side according to the fifth embodiment, and FIG. 24 shows a block diagram of a remote support system located on the instructor side.

In these drawings, reference numeral 75 designates the left hand of the operator 1, 76 a mouse for the operator 1, 77 a left switch, 78 a right switch, 79 a machine for demonstration or pre-experience having the same structure as the target machine 3, 80 a right hand of the instructor 2, 81 an image input device for the instructor 2, 82 a third camera, 83 a fourth camera, 84 an image input module, 85 a test device for the instructor 2, and 65 and 86 sensor controllers.

If the operator 1 is a beginner or has no experience, the first and second cameras 71 and 72, which are the photographing means, are turned off and the test machine 59 is also turned off. As the instructor 2 photographs the demonstration machine 79 with the third and fourth cameras 82 and 83, the photographed image of the machine 79 is displayed in the first and second LCDs 7 and 8 and in the third and fourth LCDs 82 and 83. In this case, like the fourth embodiment, the image of the machine 79 photographed by the third camera 82 is displayed in the first and third LCDs 7 and 73, and the image of the machine 79 photographed by the fourth camera 83 is displayed in the second and fourth LCDs 8 and 74.

After the instructor 2 measures the forces F1 and F2 and the rotational torque T using the test machine 85 in order to examine the assembled condition of the demonstration machine 79, the operation information transmitting means of CPU 21 (not shown) sends operation information such as the image of the examination made on the machine 79 by the instructor 2, the forces F1 and F2, the rotational torque T, sound, work environment, etc. to the operator terminal S1 as work instructions. Then, the first operation information display means of CPU 13 (not shown) displays force data in the respective force information display windows of the first and second LCDs 7 and 8. The second operation information display means of CPU 21 (not shown) displays force data in the respective force information display windows of the third and fourth LCDs 73 and 74.

Therefore, the operator 1 can obtain the operation information such as the image of the inspection made by the instructor 2 on the assembled condition of the machine 79, the forces F1 and F2, the rotational torque T, sound and work environment before he or she actually assembles or inspects the target machine 3. Thus, the operator 1 can experience necessary work beforehand.

Subsequently, the operator 1 turns on the first and second cameras 71 and 72 and the inspection unit 59 and turns off the third and fourth cameras 82 and 83 and inspection unit 85 in order to assemble or inspect the subject machine 3. In this case, the image of the subject machine 3 photographed by the first camera 71 is displayed in the first and third LCDs 7 and 73, and the image of the machine 3 photographed by the second camera 72 is displayed in the second and fourth LCDs 8 and 74.

In this manner, the operator 1 is able to experience the necessary work prior to assembling and/or inspecting the machine 3 so that the operator will recall the experienced work and environment when he or she conducts the work. Even if the operator 1 forgets the experienced work and environment, the instructor 2 can send the operation information to the operator terminal S1 again.

In this embodiment, the operation information is sent and received between a single operator 1 and a single instructor 2. However, it is possible to exchange the operation information between a plurality of operators and a plurality of instructors. In such a case, the cameras and LCDs of the respective image input devices and the inspection units connected to the internet 18 are turned on and off as a central instructor sends work instructions to other instructors and the operators.

A sixth embodiment of the present invention will be described below. Similar reference numerals are assigned to similar parts in the third and sixth embodiments, and description of these parts will be omitted here.

Figure 25:
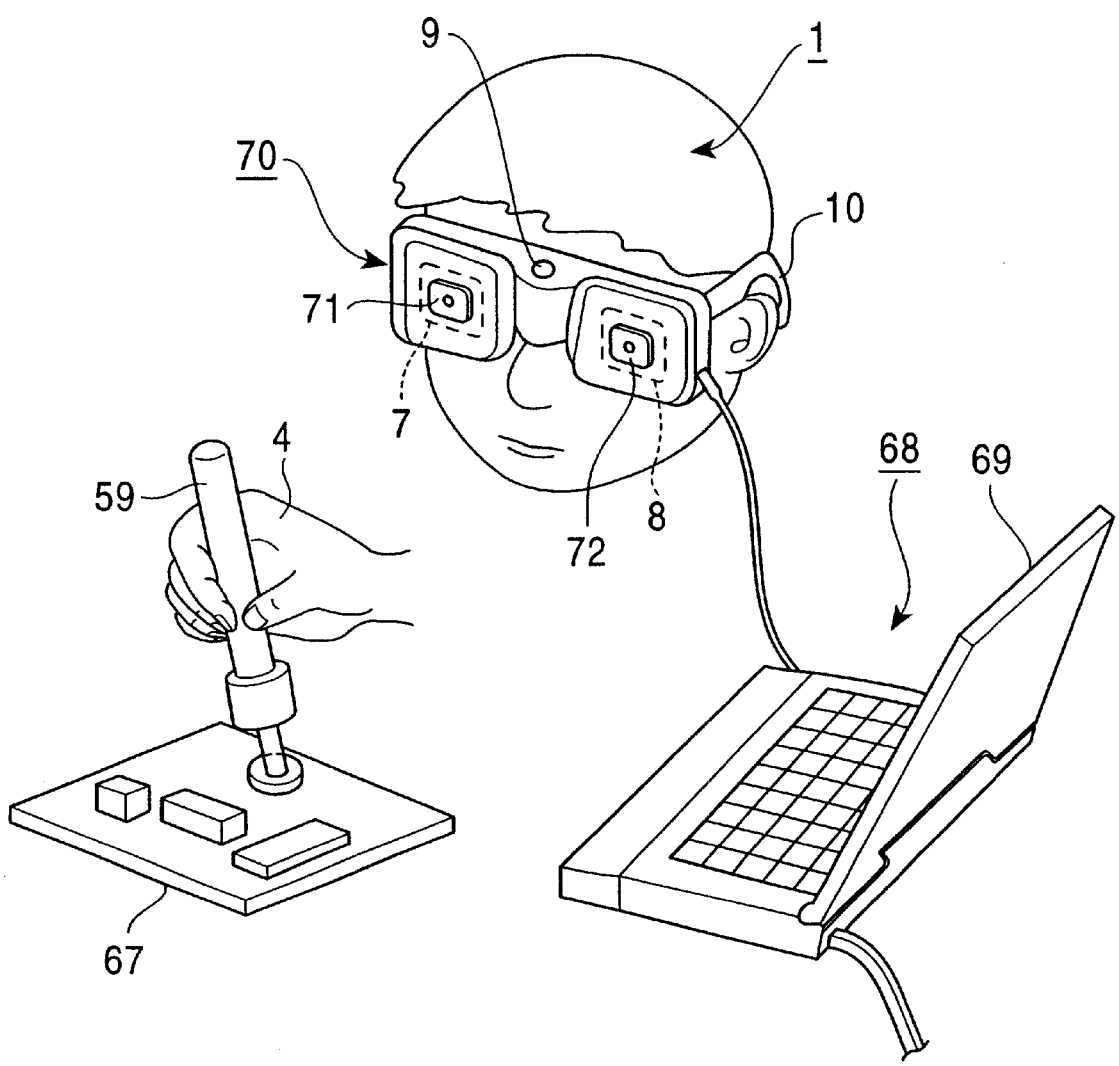
FIG. 25 depicts a perspective view of a remote work supporting system in a sixth embodiment.

Referring to FIG. 25, illustrated is a perspective view of a remote work supporting system according to the sixth embodiment of the present invention.

The image input device 70 for receiving a stereo image integrally includes the first and second cameras 71 and 72, which are the photographing means, the first and second LCDs 7 and 8, the microphone 9 and the speaker 10. The operator 1 holds the inspection unit 59 in the right hand 4, and inspects the assembled condition of the target machine 67 with the inspection unit 59.

The first camera 71 is subjected to the right eye 1*a* of the operator 1 (FIG. 1) and the first LCD 7, and the second camera 72 is subjected to the left eye 1*b* of the operator 1 and the second LCD 8.

A seventh embodiment of the present invention will be described. Similar reference numerals are assigned to similar parts in the fifth and seventh embodiments, and description of these parts will be omitted here.

Figure 26:
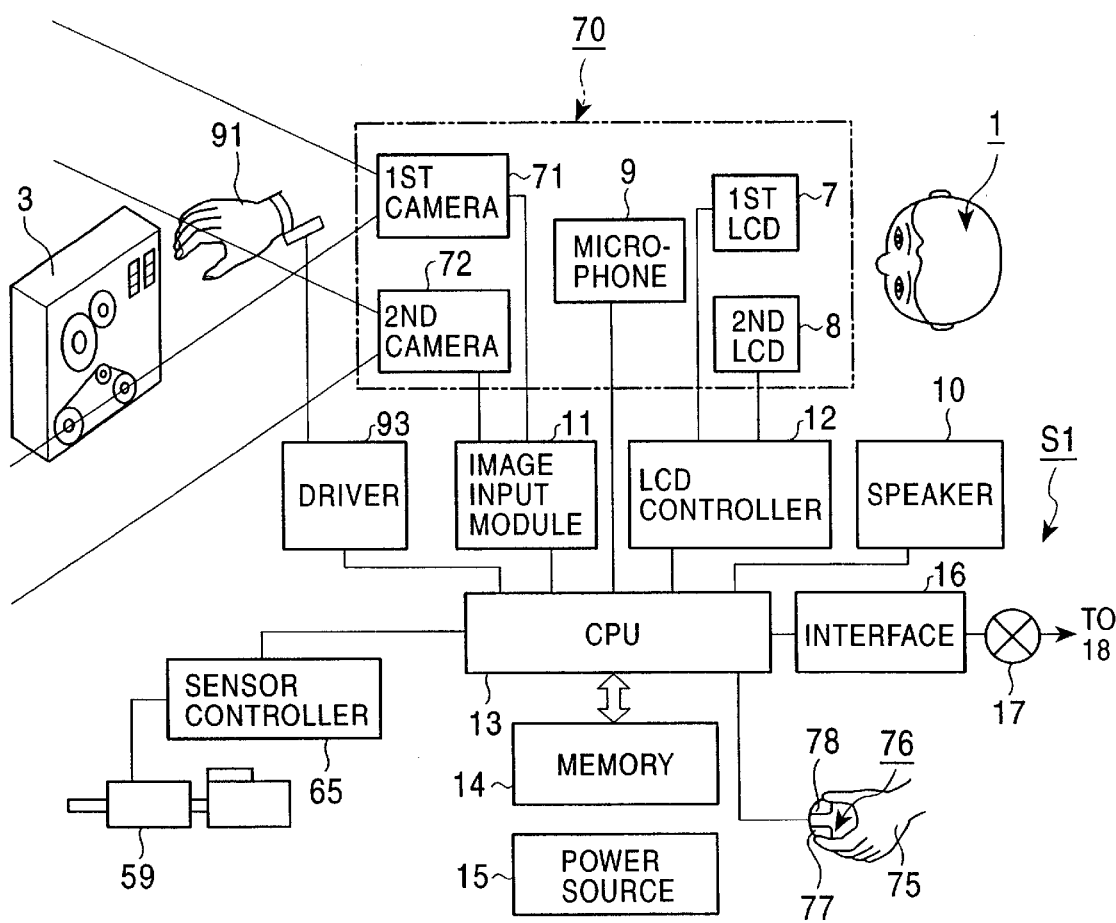
FIG. 26 depicts a block diagram of a remote work supporting system on the operator side in a seventh embodiment.
Figure 27:
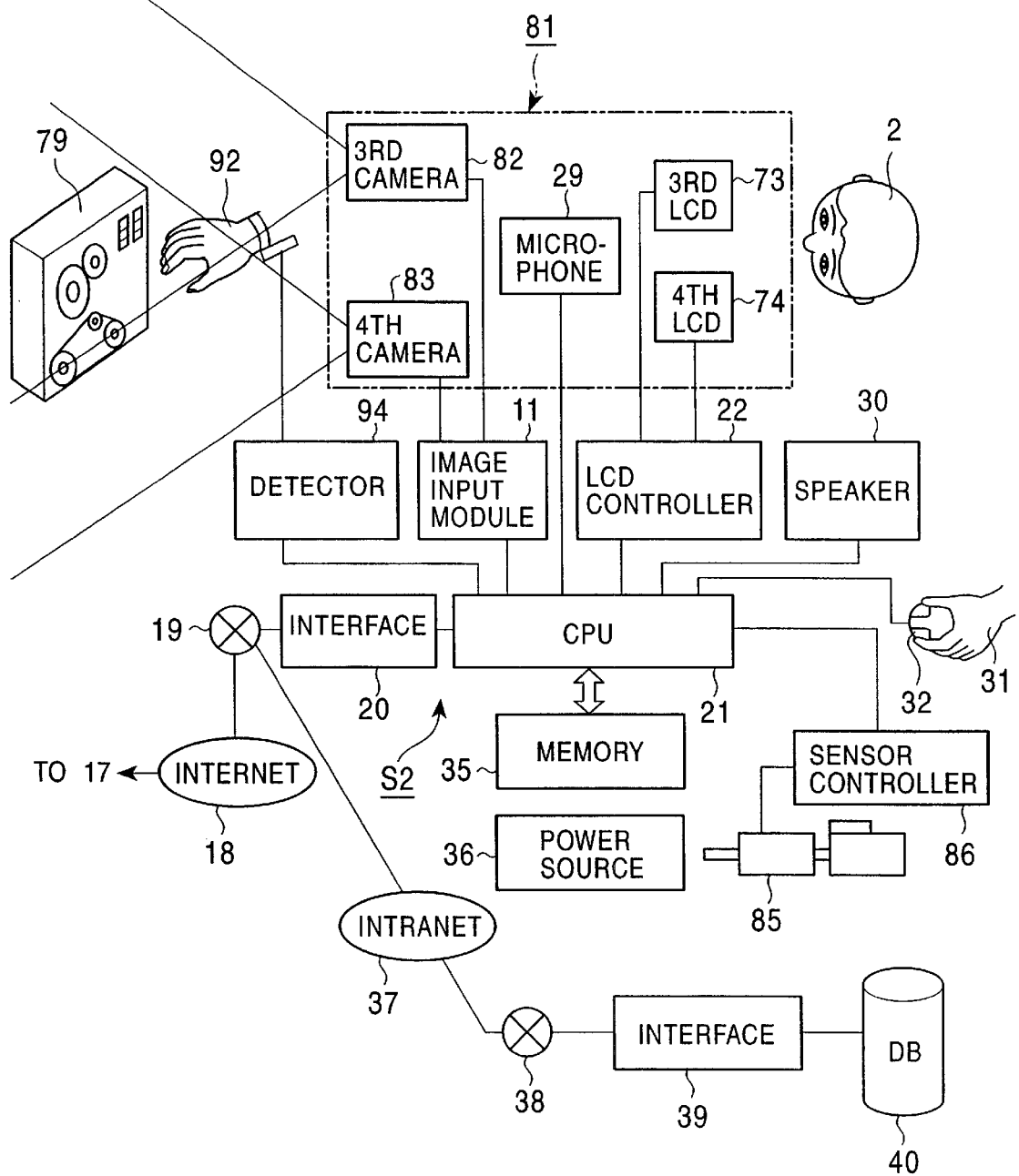
FIG. 27 depicts a block diagram of a remote work supporting system on the instructor side in the seventh embodiment.

FIG. 26 illustrates a first conceptual diagram of a remote work support system arranged on the side of the operator 1 according to the seventh embodiment, and FIG. 27 illustrates a second conceptual diagram of the remote work supporting system on the side of the instructor 2.

In these drawings, reference numerals 91 designates a glove worn by the right hand (not shown) of the operator 1, 92 a glove worn by the right hand (not shown) of the instructor 2, 93 a driver, which serves as a drive unit to drive a mechanism (not shown) for moving the glove 91 to an arbitrary position, and 94 a detector for detecting movements/behavior of the instructor 2 based on the position of the glove 92. An image of the target machine 3 photographed by the first camera 71 is displayed in the first and third LCDs 7 and 73, and an image of the machine 3 photographed by the second camera 72 is displayed in the second and fourth LCDs 8 and 74.

If the operator 1 is a beginner, the instructor 2 wears the glove 92 on his or her right hand and moves the testing device 85 to examine the assembled condition of the demonstration device 79. Then, the position of the glove 92 is detected by the detector 94, and a detection signal is sent to CPU 21. Subsequently, a movement information transmitting and processing means (not shown) in CPU 21 sends the detection signal to CPU 13 over the internet 18 as movement information.

CPU 13 drives the driver 93 based on the movement information, and causes the glove 91 to move to a position corresponding to the position of the glove 92 so that the operator 1 can take a corresponding action. Accordingly, the operator 1 is able to assemble or examine the target machine 3 in accordance with the instructing action of the instructor 2 displayed in the first and second LCDs 7 and 8.

Next, an eighth embodiment of the present invention will be described. In this embodiment, three-dimensional instructions are displayed in a screen (or screens) adapted to indicate a three-dimensional image. Similar parts and elements are assigned similar reference numerals in the fifth and eighth embodiments and description of these parts will be omitted.

Figure 28:
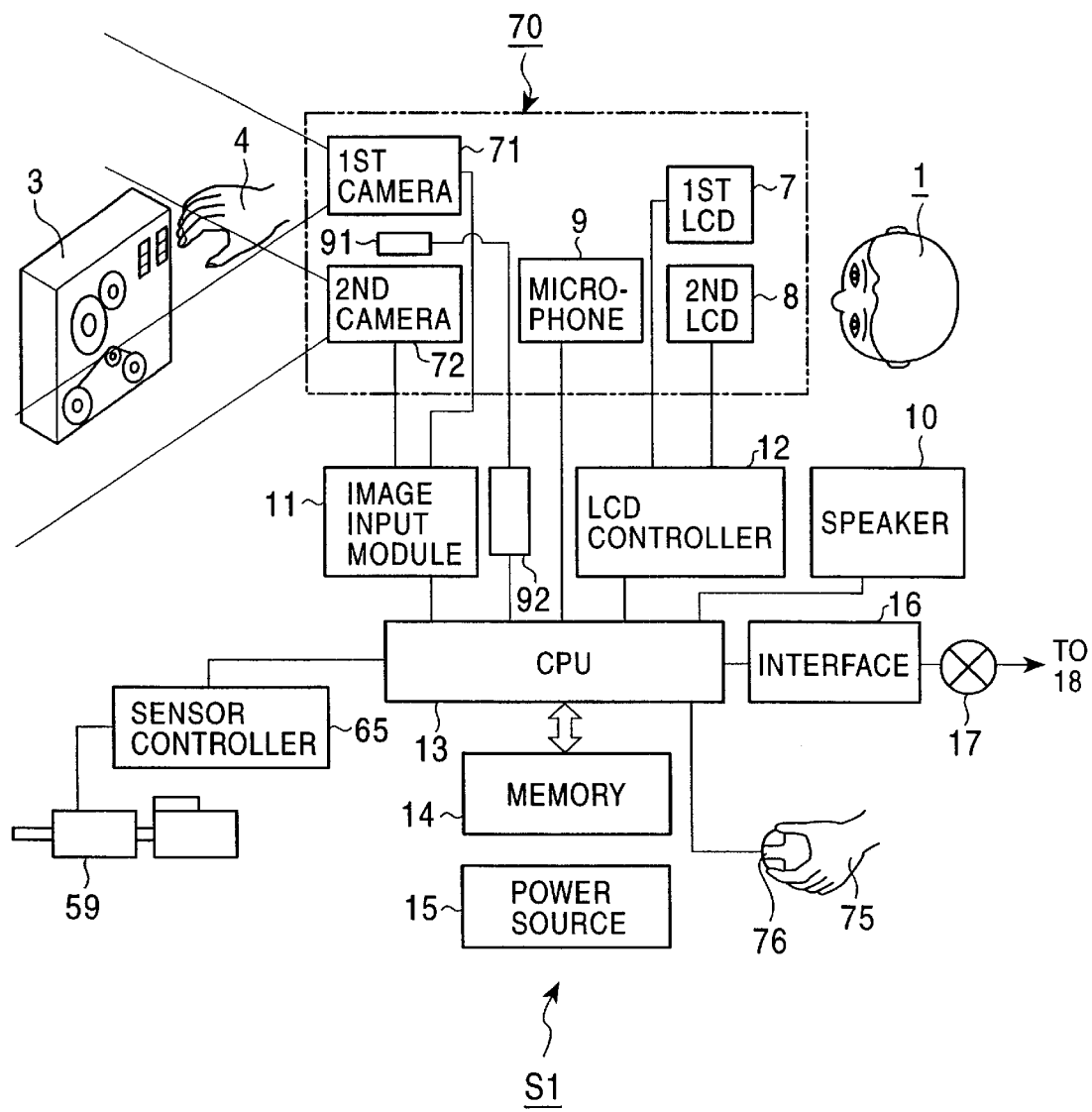
FIG. 28 shows a block diagram of a remote work supporting system on the operator side according to an eighth embodiment.
Figure 29:
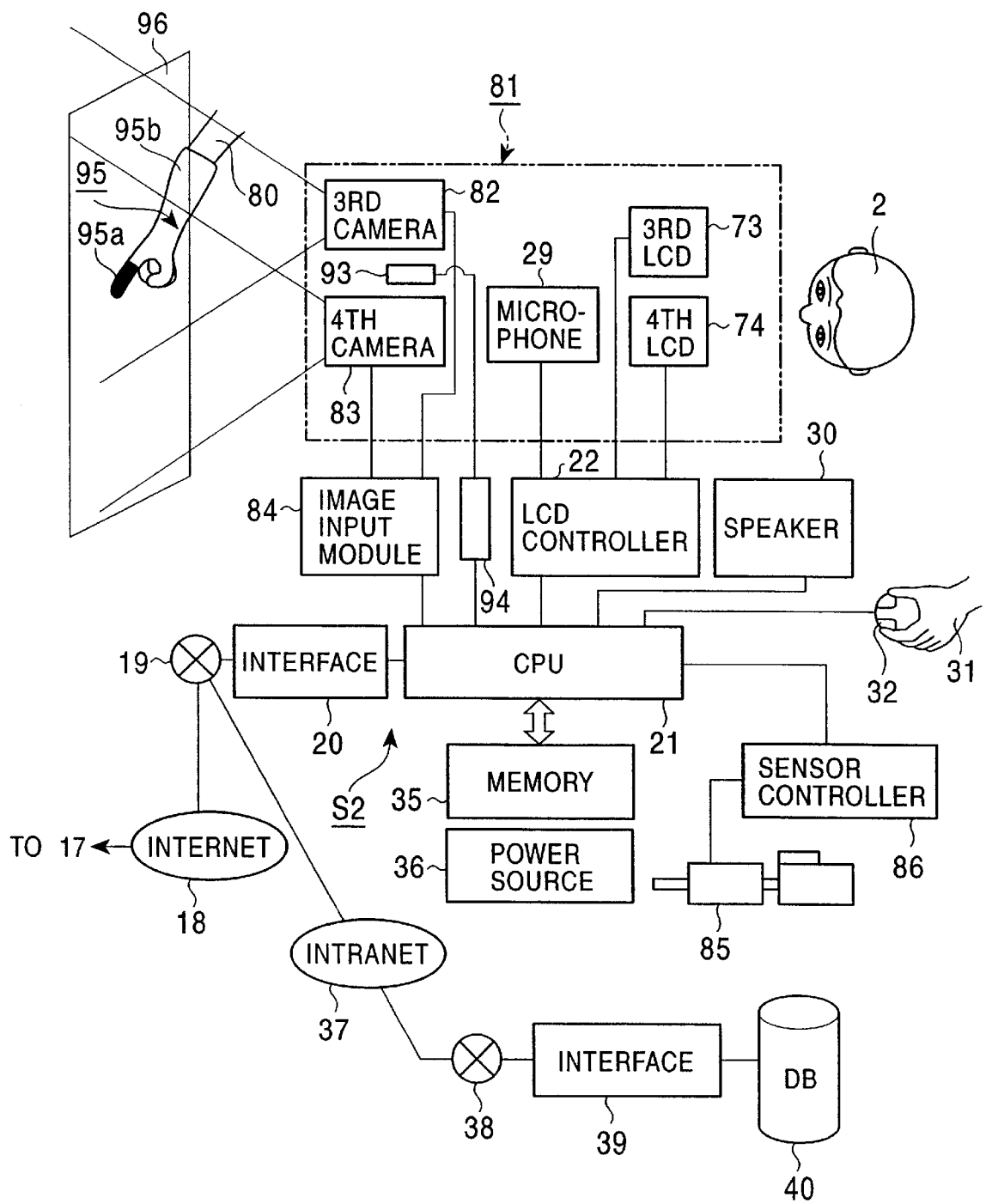
FIG. 29 shows a block diagram of a remote work supporting system on the instructor side according to the eighth embodiment.
Figure 30:
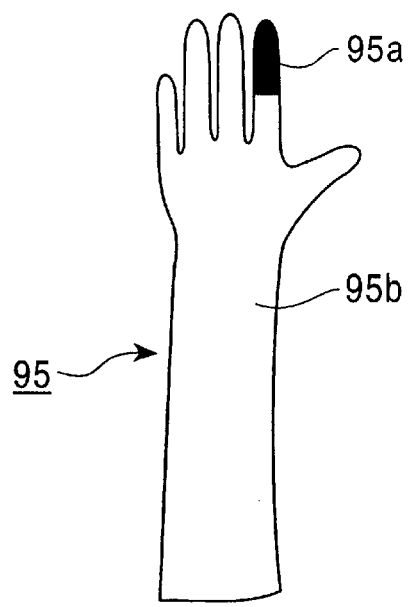
FIG. 30 shows the front side of an instruction glove utilized in the eighth embodiment.
Figure 31:
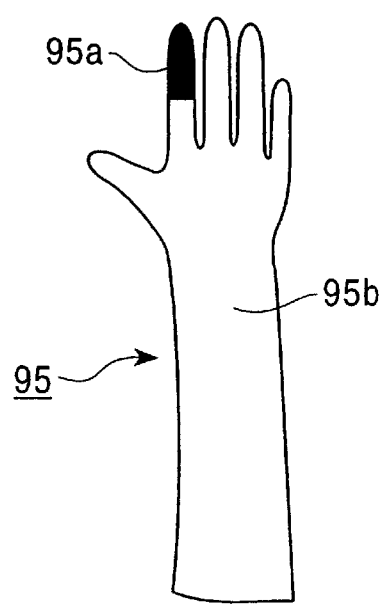
FIG. 31 shows the back side of the instruction glove.

FIG. 28 illustrates a block diagram of a remote work support system located on the side of the operator 1 according to the eighth embodiment, FIG. 29 illustrates a block diagram of a remote work support system located on the side of the instructor 2, FIG. 30 illustrates the front side of a glove used to give instructions, and FIG. 31 illustrates the back side of the instruction glove.

In these drawings, reference numeral 91 and 93 designate distance sensors, 92 and 94 sensor controllers, 95 an instruction glove, and 96 a background screen.

The instruction glove 95 put on the right hand 80 of the instructor 2 is photographed by the third and fourth cameras 82 and 83, and displayed in the third and fourth LCDs 73 and 74. Thus, the instructor 2 can recognize the instruction glove 95 three-dimensionally.

The instruction glove 95 includes a single predetermined finger (forefinger) 95*a* and a main body 95*b* including other fingers. The forefinger 95*a* has a different color than the main body 95*b*. Further, the color of the forefinger 95 differs from that of the background screen 96, but the color of the main body 95*b* is the same as the background screen 96.

Therefore, it is possible to have the forefinger 95*a* only stand out in relief as the instructing element by a chroma key technique using the color of the main body 95*b* and background screen 96.

To do so, the instructor 2 moves the mouse 32 to an area where the chroma key process should be applied, while watching an image displayed in the third and fourth LCDs 73 and 74, and specifies the area to be processed by chroma key technique. CPU 21 processes the image based on a chroma key composition program stored in the memory 35 beforehand, such that the forefinger 95*a* only stands out in relief.

After that, the image which has undergone the chroma key treatment to have the standing out forefinger 95*a*, and an image of the target machine 3 photographed by the first and second cameras 71 and 72 are synthesized, and the resulting image is displayed in the first and second LCDs 7 and 8 as well as in the third and fourth LCDs 73 and 74. Consequently, the operator 1 and instructor 2 can recognize the image of the forefinger 95*a* and target machine 3 three dimensionally.

In this case, if the distance between the third and fourth cameras 82 and 83 is greatly different from that between the first and second cameras 71 and 72, the image of the forefinger 95*a* and that of the target machine 3 cannot be synthesized appropriately. Thereupon, the distance sensor 91 is associated with the image input device 70 to measure the distance between the first and second cameras 71 and 72 and the distance sensor 93 is associated with the image input device 81 to measure the distance between the third and fourth cameras 82 and 83 in this embodiment. Outputs of these distance sensors 91 and 93 are utilized when the images are synthesized.

The distance sensor 91 generates a sensor output in proportion to the distance between the first and second cameras 71 and 72. Therefore, when the operator 1 operates the mouse 76 to input a command for distance measurement to CPU 13, CPU 13 reads the sensor output from the distance sensor 91 via the sensor controller 92, converts the sensor output to distance according to a distance measurement and display program stored in the memory 14 beforehand, and displays the distance in the first and second LCDs 7 and 8. This distance is sent to the instructor terminal S2 over the internet 18 and also displayed in the third and fourth LCDs 73 and 74.

Likewise, the sensor output generated by the distance sensor 93 is read into CPU 21 via the sensor controller 94, and converted to distance by CPU 21. The distance is then displayed in the third and fourth LCDs 73 and 74 as well as the first and second LCDs 7 and 8.

The operator 1 and instructor 2 adjust the distance between the first and second cameras 71 and 72 and that between the third and fourth cameras 82 and 83 based on the displayed distances respectively. For this reason, screws (not shown) fixing the first and second cameras 71 and 72 and the third and fourth cameras 82 and 83 may be loosened, for example, to relocate these cameras toward the center or outwards if necessary, and tightened again to fix the cameras.

It should be noted that the distance between two eyes of each operator 1 and that of each instructor 2 may be measured beforehand, an operator 1 having a relatively short eye-to-eye distance and an instructor having a relatively short eye-to-eye distance may become a team. By doing so, the above described distance adjustment will be dispensed with.

It should also be noted that actuators or mechanisms that can adjust the distance between the cameras 71 and 72 and that between the cameras 82 and 83 according to control signals from CPUs 13 and 21 may be located at the positions of the distance sensors 91 and 93 respectively, and programs may be stored in the memories 14 and 35 for calculating an average of the sensor outputs of the distance sensors 91 and 93 and controlling the actuators or mechanisms using the calculated average as a target value. This enables automatic distance adjustment.

As described above, since the instructions of the instructor 2 are displayed three-dimensionally in the first and second LCDs 7 and 8 and the third and fourth LCDs 73 and 74 respectively, the instructions are given vividly with reality. The instructor 2 can feel as if he or she was in front of the target machine 3 so that he or she is able to give instructions to the operator 1 with an easy operation using the forefinger 95a.

In the eighth embodiment, incidentally, the instructor 2 can feel reality as if there was the target machine 3 in front of him or her, but in actuality the machine 3 does not exist in the instructor terminal S2 so that the instructor 2 cannot feel anything on the forefinger 95a. Further, the instructor 2 should hold the forefinger 95a in the air. Therefore, as the instructing period becomes longer, the instructor's arm feels fatigue, the position pointed by the forefinger 95a moves from an intended position and/or the forefinger 95a trembles.

In consideration of these facts, will be described a ninth embodiment of the present invention that gives a feel to the forefinger 95a of the instructor 2. Similar reference numerals are allotted to similar parts and elements in the eighth and ninth embodiments, and description of these elements will be omitted.

Figure 32:
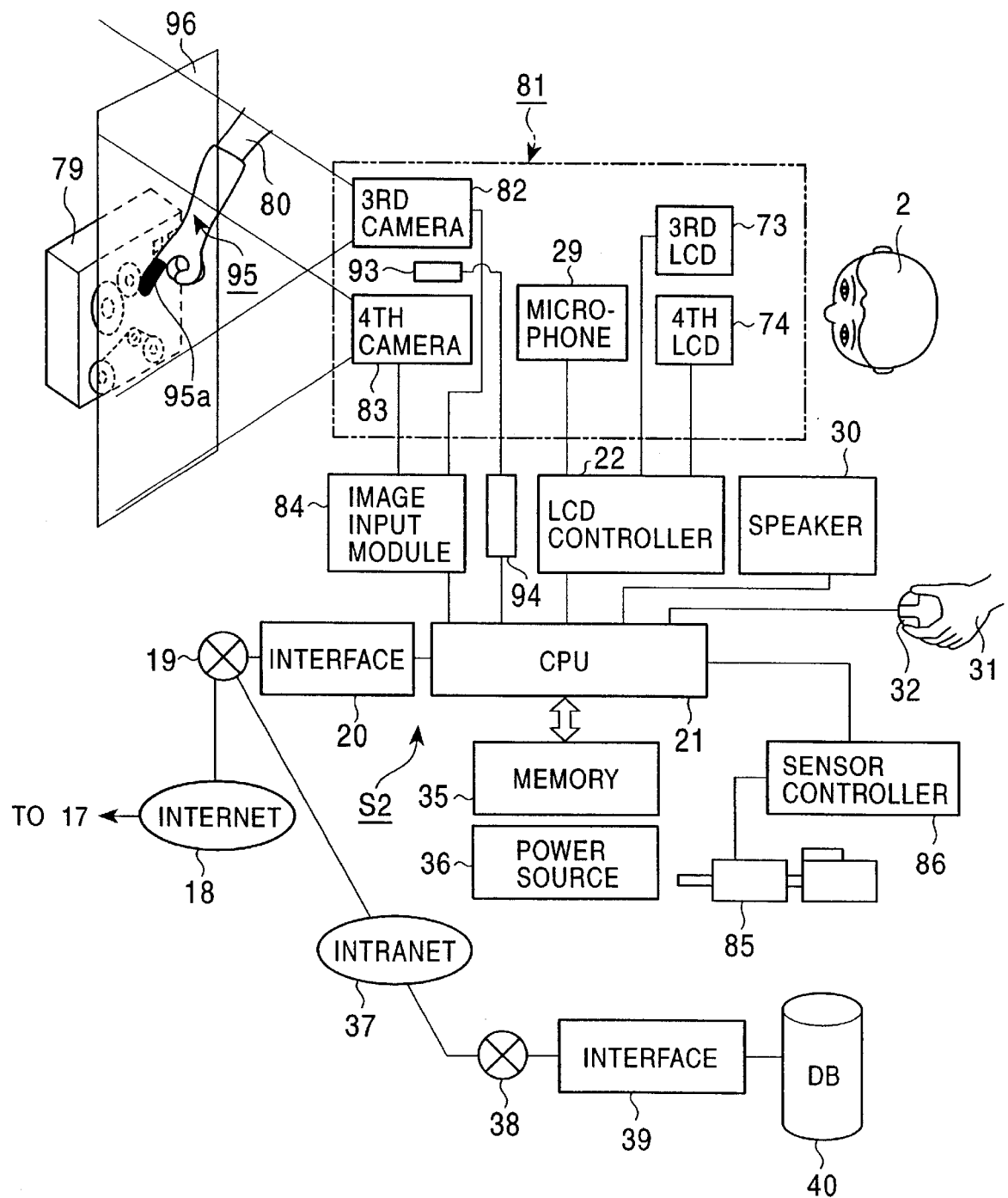
FIG. 32 illustrates a block diagram of a remote work supporting system on the instructor side in a ninth embodiment.

Referring to FIG. 32, illustrated is a block diagram of a remote work supporting system on the instructor side according to the ninth embodiment.

First, the distance between the third and fourth cameras 82 and 83 and the demonstration machine 79 is adjusted to match to that between the first and second cameras 71 (FIG. 28) and 72 and the target machine 3. At the same time, an image creation program stored in the memory 35 is activated such that the image of the target machine 3 photographed by the first and second cameras 71 and 72 and having a reduced density is synthesized with the image of the demonstration machine 79 photographed by the third and fourth cameras 82 and 83. The resulting image is displayed in the third and fourth LCDs 73 and 74. The instructor 2 then adjusts the distance such that the size of the demonstration machine 79 becomes equal to that of the target machine 3. Upon completion of the distance adjustment, the instructor 2 locates the background screen 96 at a predetermined position in front of the demonstration machine 79. After that, like the eighth embodiment, the chroma key process is performed such that the forefinger 95a only stands out. Then, the image of the forefinger 95a is combined to the images of the target machine 3 and demonstration machine 79.

Therefore, the instructor 2 can send the instructions to the operator 1 by touching the background screen 96 with the forefinger 95a. Accordingly, the instructor 2 can not only have a feel on the forefinger 95a but also does not have hold the forefinger 95a in the air. Consequently, even if the instructing period becomes longer, the instructor's arm does not get tired, the pointed position does not deviate from an intended position, and the forefinger 95a does not tremble.

In the eighth and ninth embodiments, the instructor 2 can send the instructions to the operator 1 three-dimensionally by using the forefinger 95a. However, when the instructor 2 needs to send instructions which must use a whole hand such as grasping, rubbing and hitting the machine, the image of the target machine 3 photographed by the first and second cameras 71 and 72 is hidden by the instruction glove 95 if the above described chroma key treatment is applied to the whole instruction glove 95. In consideration of this, a tenth embodiment that prevents the image of the target machine 3 photographed by the first and second cameras 71 and 72 from being hidden by the instruction glove 95 will be described. Similar reference numerals are allotted to similar parts in the eighth and tenth embodiments, and description of these part will be omitted.

Figure 33:
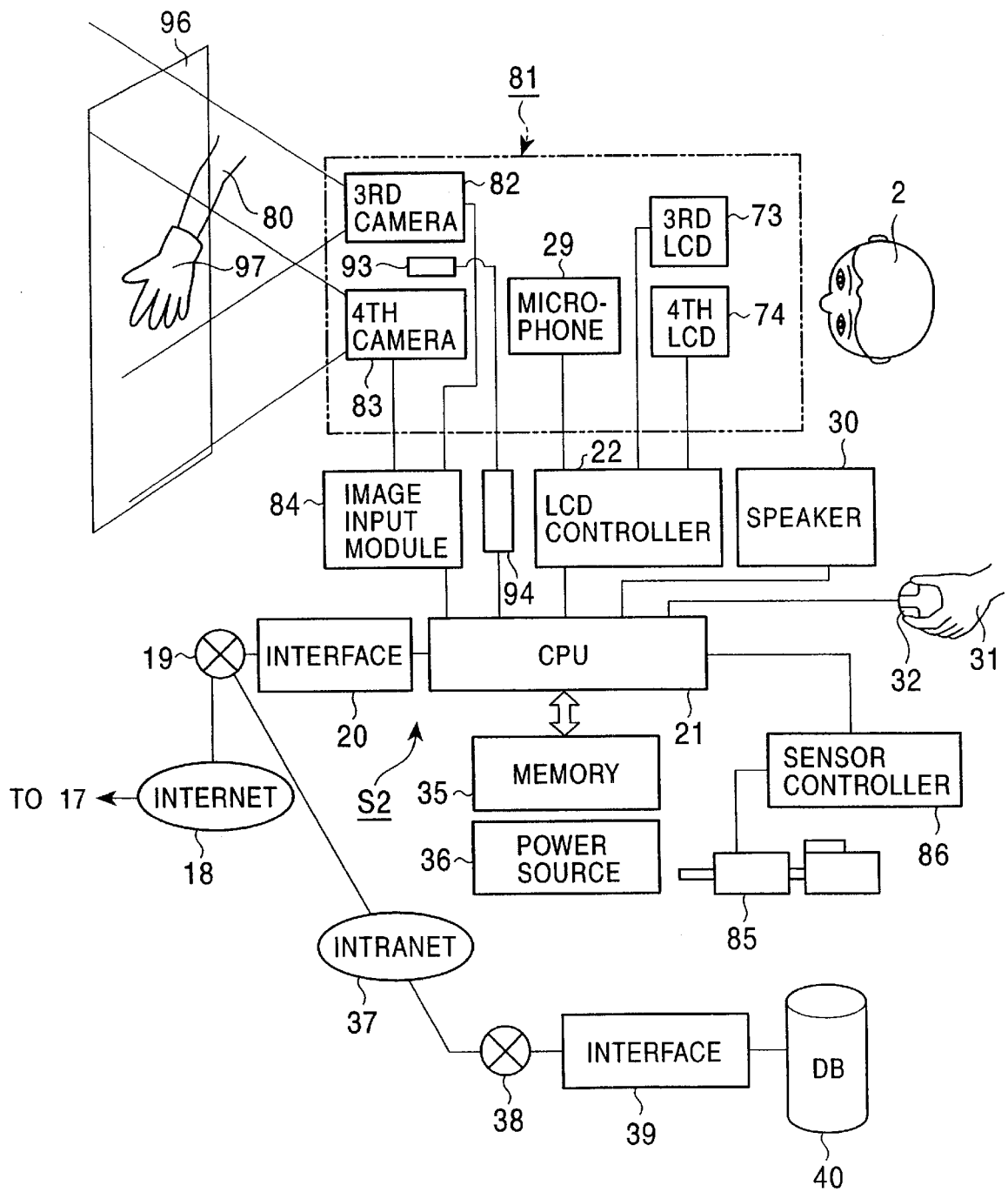
FIG. 33 illustrates a block diagram of a remote work supporting system on the instructor side in a tenth embodiment.
Figure 34:
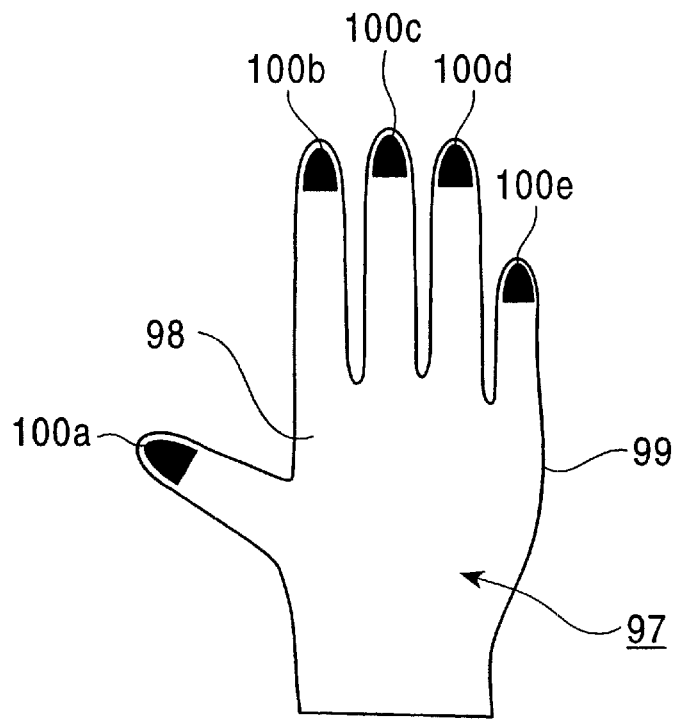
FIG. 34 illustrates the front side of an instruction glove utilized in the tenth embodiment.
Figure 35:
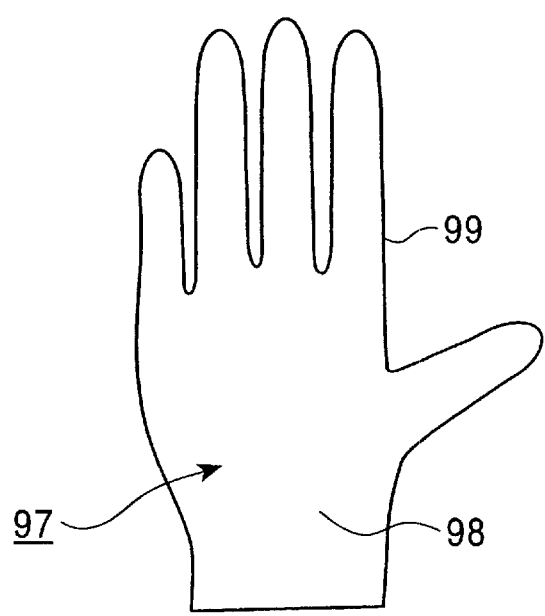
FIG. 35 illustrates the back side of the instruction glove.

FIG. 33 illustrates a block diagram of a remote work support system on the operator side according to the tenth embodiment, FIG. 34 illustrates the front side of the instruction glove, and FIG. 35 illustrates the back side of the instruction glove.

In this embodiment, the instructor 2, i.e., a person handling this particular job in a design section, wears an instruction glove 97 on the right hand 80. The image synthesis is then conducted by the chroma key treatment. The instructor can therefore send instructions to the operator 1 (FIG. 28) three dimensionally through movements of the instruction glove 97.

As shown in FIG. 34, the instruction glove 97 has a different color in its edge portion (or contour) 99 and finger portions 100a to 100e than a main portion 98. The color of the contour 99 and finger portions 100a to 100e is different from that of the background screen 96, and the color of the main portion 98 is the same as the background screen 96. The chroma key treatment is applied using the color of the main portion 98 and background screen 96 so that the contour 99 and finger portions 100a to 100e only stand out in the displayed image. It should be noted that the right and left hands and the front and back sides of the instruction glove 97 can be distinguished by looking at presence/absence of the finger portions 100a to 100e, position of the thumb or the like. FIGS. 34 and 35 depict the right hand glove.

Since the contour 99 and finger portions 100a to 100e are only synthesized to the image of the target machine 3, the image of the target machine 3 is not unnecessarily hidden even if the instructor 2 sends instructions using his or her entire hands.

Further, since the instruction glove 97 is photographed by the third and fourth cameras 82 and 83, the operator (primary operator) 1 and instructor (secondary operator) 2 can recognize the image three-dimensionally.

In the foregoing embodiments, the image input device 5 (FIG. 19), 70 is worn on the face of the operator 1 so that the operator 1 has free hands and therefore he or she can use the hands in the same way as when no image input device is worn. Moreover, the first and second LCDs 7 and 8 follow movements of the face of the operator 1 so that the operator 1 can surely see the instructions from the operator 1 regardless of the working posture the operator should take.

However, when the instructor 2 sends a plurality of instructions with respect to the same working area, it is necessary to fix the camera 6, which is photographing the working area. If the camera 6 moves, the instructor 6 should amend the instructing position in accordance with the movements of the camera 6.

Next, an eleventh embodiment that can secure the camera 6 will be described.

Figure 36:
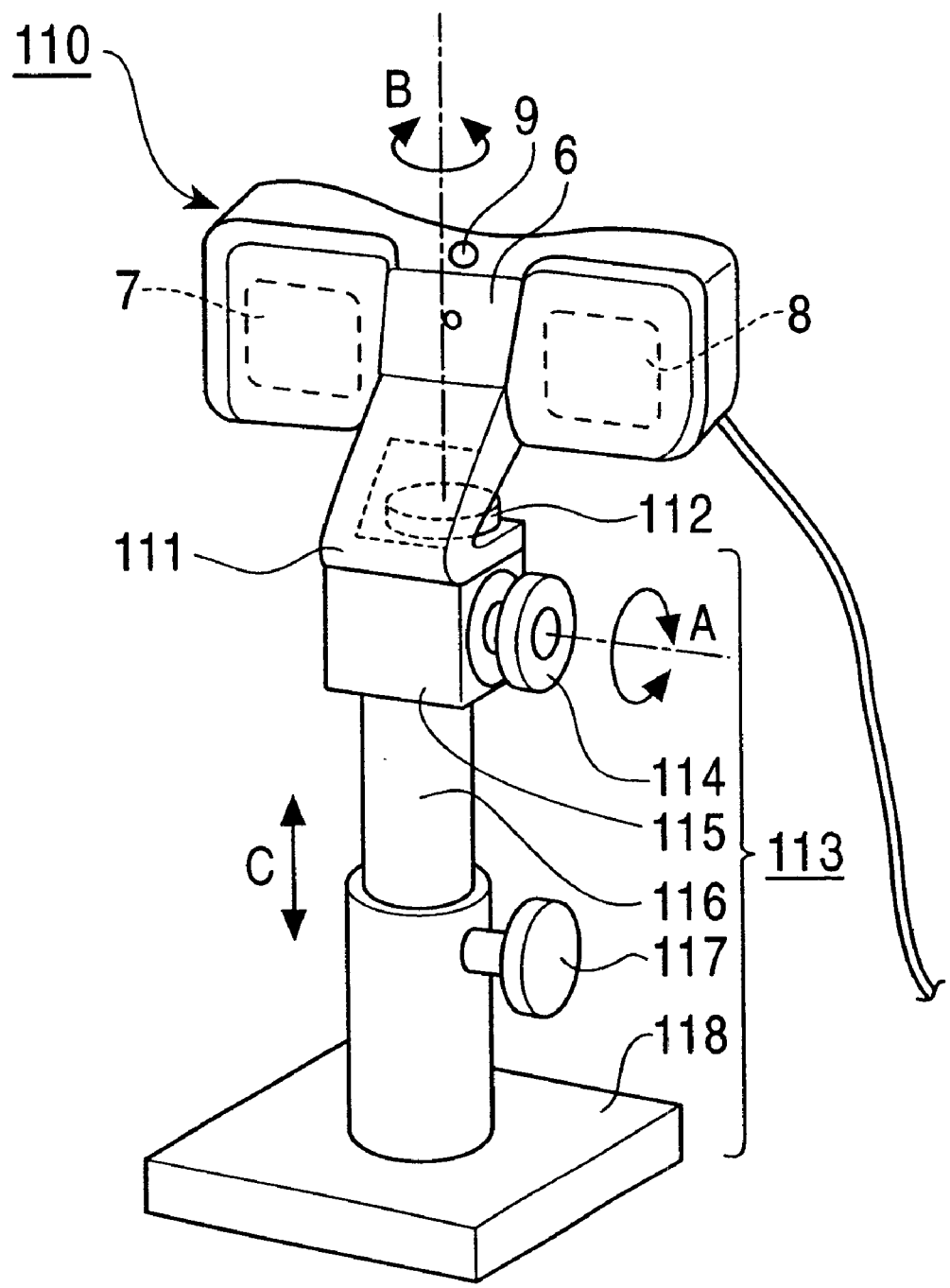
FIG. 36 illustrates a perspective view of an image input device according to an eleventh embodiment.

Referring to FIG. 36, illustrated is a perspective view of an image input device according to the eleventh embodiment.

In this drawing, reference numeral 110 designates an image input device, 6 a camera (photographing means), 7 a first LCD, 8 a second LCD, 9 a microphone, 111 a pedestal (supporting stand), and 113 a fixing assembly. The fixing assembly 113 includes a pan fixing screw 112, a tilt fixing screw 114, a tilt base 115, a shaft 116, a height fixing screw 117 and a bottom stand 118.

In this embodiment, the image input device 110 is secured onto the fixing assembly 113 positioned on a work stand (not shown). Therefore, the camera 6 does not move together with movements of the operator's face (FIG. 1), and the displayed position of the instructions from the instructor 2 matches the work position of the machine 3. In addition, because the distance between the camera 6 and target machine 3 is kept constant, it is possible to raise display accuracy for overlapped parts.

Moreover, since the image input device 110 is located on the work stand, the operator 1 can take eyes off the first and second LCDs 7 and 8 by simply moving his or her face without using hands when the eyes are tired.

It should be noted that the operator 1 needs to press his or her face against the image input device 110 during operation so that he or she may feel some stresses in holding the same posture. In such a case, the operator 1 may adjust the tilt direction of the fixing assembly (indicated by the arrow A) and/or the pan direction (indicated by the arrow B) such that the operator can look at the machine through the image input device 110 in a seated posture as much as possible. This will reduce the stresses.

A twelfth embodiment of the present invention will now be described.

Figure 37:
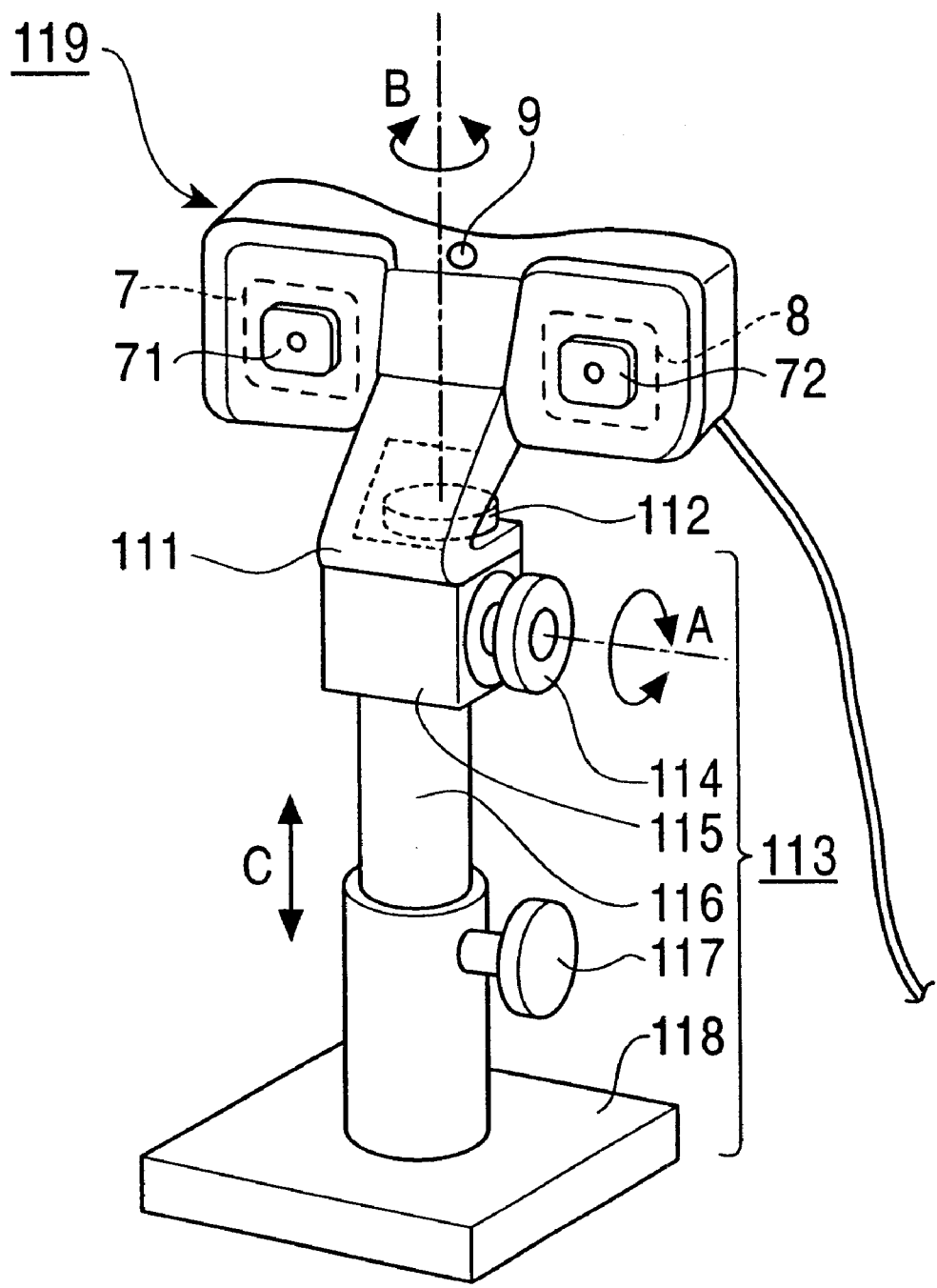
FIG. 37 illustrates a perspective view of an image input device according to a twelfth embodiment.

Referring to FIG. 37, illustrated is a perspective view of an image input device of the twelfth embodiment.

In this drawing, reference numeral 119 designates an image input device, 71 a first camera, 72 a second camera, 7 a first LCD, 8 a second LCD, 9 a microphone, 111 a pedestal (supporting stand), and 113 a fixing assembly. The fixing assembly 113 includes a pan fixing screw 112, a tilt fixing screw 114, a tilt base 115, a shaft 116, a height fixing screw 117 and a bottom stand 118. The image input device 119 can be rotated about the center axis of the tilt fixing screw 114 as indicated by the arrow A and about the center axis of the pan fixing screw 112 as indicated by the arrow B, and moved in the arrow C direction.

In this embodiment, it is possible to input a stereo image through the first and second cameras 71 and 72.

It should be noted that the present invention is not limited to the illustrated and described embodiments. Various changes and modifications may be made by those having an ordinary skill in the art without departing from the spirit and scope of the present invention, and such modifications are also encompassed by the present invention.

As understood from the above description, the present invention provides a remote work supporting system that includes a photographing means for photographing a work target machine, which is to be worked on by the first operator, a first display for displaying an image of the target machine photographed by the photographing means to the first operator, a second display for displaying the image to a second operator, an operation unit to be operated by the second operator, and an instruction displaying and processing means for displaying instructions in the first display based on operations of the operation unit.

Since the image of the target machine photographed by the photographing means is displayed in the first display, and the instructions are displayed in the first display in accordance with the operations made on the operation unit by the second operator, the first and second operators can share the information in a great amount, the time for analyzing a trouble will be shortened, and a product manufacturing cost will be reduced.

What is claimed is:

1. A remote work supporting system comprising:
a first unit including photographing means operated by a first operator for photographing a work target machine to generate an image signal, a first display located near the respective photographing means for displaying an image based on the image signal supplied thereto, a first communication interface unit, and a first controller for controlling said photographing means and first display to cause the first display to superpose the image created based on the image signal and a screen indicating instruction contents of an instruction signal fed via the first communication interface unit, and for feeding the image signal to the first communication interface; and
a second unit including an operation unit for generating the instruction signal based on an instruction input made by a second operator, a second display located near the operation unit for displaying an image based on the image signal supplied thereto, a second communication interface unit for transmitting a signal supplied via the first communication interface and communication network in both directions, and a second controller for causing the respective second display to superpose a screen indicating the instruction signal and a screen indicating the image signal supplied via the first interface unit and for feeding the instruction signal to the second communication interface unit.

2. The remote work supporting system according to claim 1, wherein said photographing means has an angle of view that is substantially the same as eyes of the first operator.

3. The remote work supporting system according to claim 1, wherein the instruction contents include at least one duplicate icon indicating a designated point to indicate a position of work to be done by the first operator.

4. The remote work supporting system according to claim 3, wherein the at least one duplicate icon include a plurality of duplicate icons displayed together with numbers indicative of the order of designated points.

5. The remote work supporting system according to claim 1, wherein the instruction contents include at least one designated frame icon indicating a designated frame to show an area of work to be made by the first operator.

6. The remote work supporting system according to claim 5, wherein the at lease one designated frame icon includes a plurality of designated frame icons displayed together with numbers indicative of the order of designated frames.

7. The remote work supporting system according to claim 1, wherein the instruction contents are retrieved parts that are retrieved by part retrieving and processing means and displayed over a work target part in the work target machine.

8. The remote work supporting system according to claim 7, wherein an image magnification is calculated to display the retrieved part over the work target part.

9. The remote work supporting system according to claim 1 further including:
first voice input means for inputting a voice of the first operator; and
first voice information transmitting and processing means for transmitting voice information of the voice to the second operator.

10. The remote work supporting system according to claim 1 further including:
   second voice input means for inputting a voice of the second operator; and
   second voice information transmitting and processing means for transmitting voice information of the voice to the first operator.

11. The remote work supporting system according to claim 1, wherein the at least one first display includes two first displays for right and left eyes of the first operator.

12. The remote work supporting system according to claim 1, wherein the at least one second display includes two second displays for right and left eyes of the second operator.

13. The remote work supporting system according to claim 1 further including:
   an inspection device for inspecting a predetermined portion in the work target machine; and
   inspection information transmitting and processing means for transmitting an inspection result obtained from the inspection device to the second operator.

14. The remote work supporting system according to claim 13 further including:
   measurement reference value retrieving and processing means located on the second operator side for retrieving a measurement reference value for inspection carried out by the inspection device; and
   measurement reference value transmitting and processing means for transmitting the measurement reference value to the first operator.

15. The remote work supporting system according to claim 11, wherein the photographing means include two photographing devices for right and left eyes of the first operator, and images of the work target machine photographed by the two photographing means are displayed in the two first displays respectively.

16. The remote work supporting system according to claim 1 further including three-dimensional image displaying and processing means for displaying a three-dimensional image in at least one of the respective first display and second display.

17. The remote work supporting system according to claim 1, wherein there are provided a plurality of terminals on at least one of the first and second operator sides, and the respective terminals on the first and second operator sides are connected to each other over a communication network.

18. The remote work supporting system according to claim 1 further including:
   a machine for pre-experience provided on the second operator side; and
   operation information transmitting and processing means for transmitting operation information of the pre-experience machine made by the second operator to the first operator.

19. The remote work supporting system according to claim 18, wherein the operation information is displayed in the respective first display.

20. The remote work supporting system according to claim 1 further including:
   a detector for detecting movements of the second operator;
   movement information transmitting and processing means for transmitting movement information obtained by the detector to the first operator; and
   a drive for causing the first operator to take an action based on the movement information.

21. The remote work supporting system according to claim 1, wherein an image of a predetermined finger of an operation glove worn by a hand of the second operator is combined with an image of the work target machine.

22. The remote work supporting system according to claim 21, wherein a background screen is provided in front of a pre-experience machine provided on the second operator side.

23. The remote work supporting system according to claim 21, wherein an image of a contour and nail portions of the operation glove is combined with an image of the work target machine.

24. The remote work supporting system according to claim 1 further including an image input device having at least the respective photographing means and first display, and wherein the image input device is worn on a face.

25. The remote work supporting system according to claim 1 further including an image input device having at least the respective photographing means and first display, and wherein the image input device is supported on a supporting base.

26. The remote work supporting system according to claim 12, wherein the photographing means include two photographing devices for right and left eyes of the first operator, and images of the work target machine photographed by the two photographing means are displayed in the two first displays respectively.

* * * * *